(12) United States Patent
Cozens et al.

(10) Patent No.: US 7,978,870 B2
(45) Date of Patent: Jul. 12, 2011

(54) ATTACHMENT APPARATUS

(75) Inventors: Raymond Derek Cozens, Stevenage (GB); Timothy Robert Burnham, Wycombe (GB)

(73) Assignee: Racal Acoustics Limited (GB)

( * ) Notice: Subject to any disclaimer, the term of this patent is extended or adjusted under 35 U.S.C. 154(b) by 1305 days.

(21) Appl. No.: 11/252,255

(22) Filed: Oct. 18, 2005

(65) Prior Publication Data

US 2006/0090246 A1    May 4, 2006

(30) Foreign Application Priority Data

Oct. 19, 2004 (GB) .................................. 0423194.0

(51) Int. Cl.
*H04R 25/00* (2006.01)

(52) U.S. Cl. ........ 381/371; 381/370; 381/374; 381/379; 381/383

(58) Field of Classification Search ..................... 2/209; 381/370–371, 374–379, 383
See application file for complete search history.

(56) References Cited

U.S. PATENT DOCUMENTS

| | | | | |
|---|---|---|---|---|
| 4,445,005 A | * | 4/1984 | Furuhashi | 381/383 |
| 4,499,593 A | | 2/1985 | Antle | |
| 5,117,464 A | * | 5/1992 | Jones et al. | 381/379 |
| 5,335,285 A | * | 8/1994 | Gluz | 381/381 |
| 5,384,857 A | | 1/1995 | Nordin et al. | |
| 5,450,496 A | | 9/1995 | Burris et al. | |
| 5,708,724 A | * | 1/1998 | Burris et al. | 381/370 |
| 6,069,964 A | * | 5/2000 | Yang | 381/374 |
| 6,154,539 A | | 11/2000 | Pitel | |
| 6,252,970 B1 | * | 6/2001 | Poon et al. | 381/374 |
| 6,466,681 B1 | | 10/2002 | Siska, Jr. et al. | |
| 2001/0025775 A1 | | 10/2001 | Krebs et al. | |
| 2004/0125977 A1 | * | 7/2004 | Hong et al. | 381/376 |

FOREIGN PATENT DOCUMENTS

| | | |
|---|---|---|
| CA | 2 496 369 | 3/2004 |
| DE | 10321449 A | 11/2003 |
| EP | 0 071 464 | 2/1983 |
| EP | 05122127 | 5/1993 |
| EP | 1 003 349 A2 | 5/2000 |
| EP | 1 536 675 A1 | 6/2005 |
| EP | 1536675 A1 | 6/2005 |
| GB | 721 258 | 1/1955 |
| GB | 0721258 A | 1/1955 |
| GB | 1091490 A * | 6/1966 |
| GB | 1 091 490 | 11/1967 |
| GB | 1091490 * | 11/1967 |
| GB | 1 229 086 A | 4/1971 |
| GB | 1229086 | 4/1971 |
| GB | 2271924 A | 5/1994 |
| GB | 2 309 351 | 1/1996 |

OTHER PUBLICATIONS

Patent Abstract of Japan 05 122127 A May 18, 1993.

* cited by examiner

*Primary Examiner* — Curtis Kuntz
*Assistant Examiner* — Ryan Robinson
(74) *Attorney, Agent, or Firm* — Lowe Hauptman Ham & Berner, LLP

(57) ABSTRACT

A headset apparatus having a headwear member (9) e.g. an ear shell, possessing a surface formation to which a separate attachment device (1) is reciprocally shaped to attach by a push-fit (e.g. by sliding, slotting or clipping) into engagement with the surface formation. In this way the attachment means may be fitted to the surface formation on the headwear member without requiring the use of through-holes passing through the body of the headwear member.

25 Claims, 13 Drawing Sheets

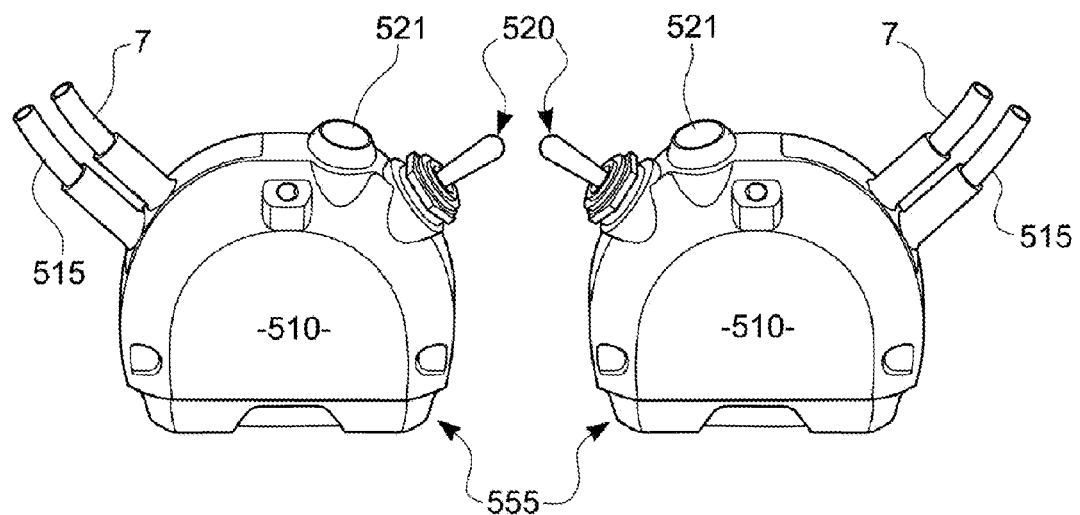
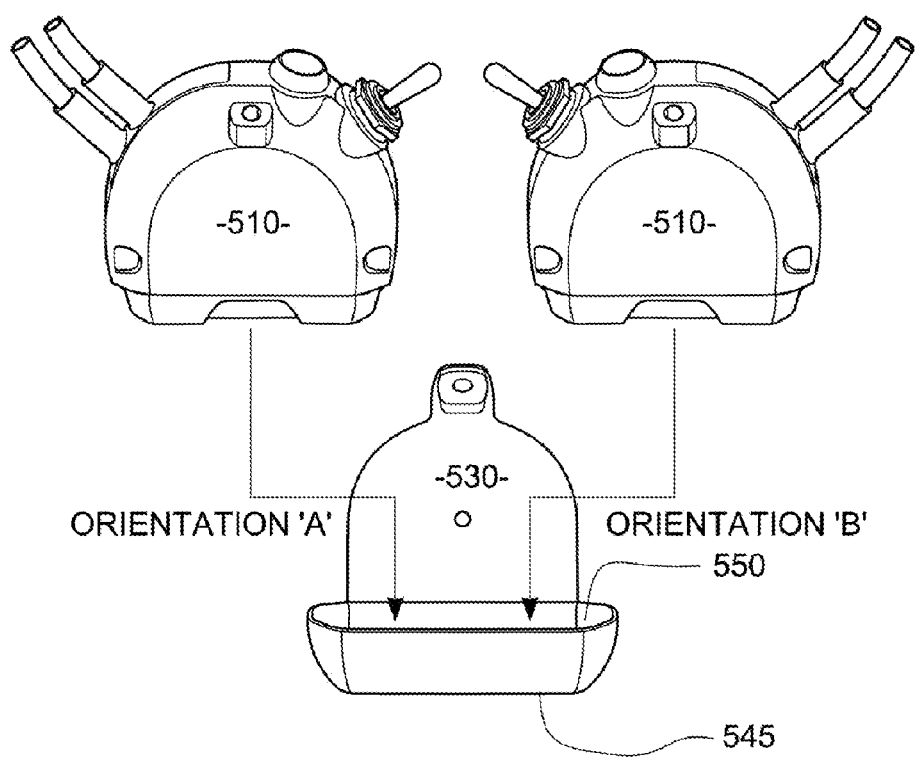

ATTACHMENT APPARATUS

The present invention relates to attachment apparatus. In particular, though not exclusively, the present invention relates to means for attaching/connecting a harness/support attachment to equipment to be worn about the person of a user.

Conventional headset apparatus, such as hearing protectors and communications headsets, generally comprise earshells whose external surfaces act as a platform for mounting other elements or articles to the headset. Such other articles include head retention mechanisms for retaining the earshells in place on the user's head, microphones for use with communications headsets, speakers or electro-acoustic transducers within the earshell of communications headsets, and electrical signal conduit cables for serving the microphones and/or transducers of a communications headset.

Current methods for attaching these articles to an earshell of a headset include the drilling of a hole into and through the body of the earshell thereby to generate a suitable means of attachment. For example, screws, rivets or plug attachments may be passed through the drilled through-hole to attach the article to the earshell. Head retention mechanisms, such as a neck band or a head band and signal conduit cables, for example often include parts arranged to pass through the body of an earshell by means of a through-hole and grommet assembly.

Such penetration of the body of the earshell seriously compromises the ability of the earshell to effectively attenuate the amount of external acoustic noise which is able to pass through the body of the earshell to the ear of the headset wearer. Leakage of air, or gaps in general, caused by such through-holes, as discussed above, allow external acoustic noise to pass through the earshell with little attenuation. This often occurs due to poor integrity of the sealing mechanism via which a through-hole is supposed to be sealed when a given article is attached to the earshell via that through-hole. Such leaks often occur around grommets and screw fixings.

Articles intended to be attached to an earshell of a headset, such as the boom arm of a headset microphone, are often connected to an earshell by means of a rigid and non-detachable attachment mounted on one side of only one earshell of a pair of earshells of a headset. This permanency of attachment renders the headset lacking in versatility since the microphone mounted to an earshell intended to cover the left-hand (or right-hand) ear of a user can only ever be used to the left-hand side (or right-hand side) of the head of the user in use. Thus, the permanency of the means of attachment of the article (in this case a microphone) to an earshell of a headset limits the versatility of that headset.

It is common for communications headsets to connect to their host equipment by means of a cable emerging from the headset body and connected to the host equipment by means of an interface connector. Types of host equipment include radio or communications consoles. Often, the host equipment requires that the user is able to remotely control the functions of the host. Such functions include, for example, transmit, mute, monitor, and override control functions of a host console.

The remote activation often requires the user to perform a hand operation on an external control device. The control device typically takes the form of a dedicated switchbox located in-line with the headset cable. The switchbox typically contains on or more manually operated switching devices as a means for controlling the desired operation of the host equipment remotely, and these switching devices are generally positioned on the switchbox to enable ease of user access thereto.

In an attempt to maximise ease of user access to the switching device of the switchbox, switchboxes often include a clothing clip arranged to enable to switchbox to be clipped to an item of apparel worn by the user. However, due to the typically non-central location of the switching device upon the switchbox, the switchbox most advantageously requires to be clipped to the user's clothing such that the switching device faces generally towards the hand intended to be used by the user in operating that switch device. Thus, the location of the switch device on the switchbox, and the location of the clothing clip on the switchbox, together inherently pre-determine which hand of the user is most suited to accessing the switch device in such situations or at least limits the regions about the person of the user to which the switch box could suitable be clipped. This greatly reduces the versatility of the switchbox in use.

The present invention aims to address the aforementioned problems.

At its most general, in one of its aspects, the present invention proposes a headset apparatus having a headwear member (e.g. an earshell) possessing a surface formation to which a separate attachment device is reciprocally shaped to attach by a push-fit (e.g. by sliding, slotting or clipping) into engagement with the surface formation. In this way the attachment means may be fitted to the surface formation on the headwear member without requiring the use of through-holes passing through the body of the headwear member. The attachment means may carry, harness, convey or include any number of articles which are intended to be used with the headwear apparatus and which might otherwise have required attachment to the headwear member via the use of through-holes. Preferably the attachment device attaches to the headwear member solely by means of its engagement with the surface formation thereof.

In this way, the attachment means may comprise any number of through-holes via which articles are attached to it, or may have such articles attached to it, or formed with, in any other way such as would be readily apparent to the skilled person. Most importantly, those articles are not themselves directly attached to the headwear member, but are indirectly attached via the attachment means.

Accordingly, in a first of its aspects, the present invention may provide a headset apparatus (e.g. a communications headset containing communications means) to be worn about the head of a user including: a headwear member shaped and arranged to be worn about the head of a user and having a surface portion shaped to define a headwear connection means; attachment means for attaching an article to the headwear member having a reciprocal connection means shaped to reciprocally correspond with a shaping of the surface portion defining the headwear connection means (e.g. which shaping extends along the surface of the headwear member) to allow the headwear connection means and reciprocal connection means push-fit together thereby to connect the attachment means to the surface of the headwear member (e.g. so as to extend thereacross) without penetrating said surface. Preferably the shaping of the surface portion defining the headwear connection means extends along the surface of the headwear item (e.g. a protusion/edge or a channel) such that when connected thereto the reciprocal connection means extends along (e.g. against) the surface of the headwear member. This permits extended reciprocal connection means to push-fit to it along an extended surface formation rather than into the body of the headwear member thereby obviating the need for a hole or deep recess extending into the headwear member for receiving reciprocal connection means by deep insertion.

In this way, attachment of an article to a headwear member (e.g. an earshell of a headset) may be achieved without requiring any through-holes for the purposes of achieving attachment. Instead, attachment of an article to a headwear member may simply be achieved by connecting or attaching that article to the attachment means, then push-fitting the surface formation of the headwear connection means together with the reciprocally-shaped connection means of the attachment means thereby to connect the attachment means to the surface of the headwear member and thereby attach the article to the headwear member in the process. Of course, the present invention in a further aspect also may provide a headset apparatus in a fully assembled form comprising the headwear member and the attachment means in the aforementioned connected state. Most preferably the attachment means and the headwear member are detachably connectable to each other.

The body of one of the headwear connection means and reciprocal connection means preferably defines a channel, recess or opening therein and the body of the other of the headwear and reciprocal connection means is preferably shaped and arranged to fit intimately within said channel, recess or opening to abut the body of the connection means where it defines said channel, recess or opening.

For example, an aforementioned channel may preferably extend across the body of the connection means in which it is formed. For example, the channel may be formed across the surface portion of the headwear member defining the headwear connection means, the reciprocal connection means being reciprocally shaped to push-fit within at least a part of the channel. The aforesaid opening may, for example, be an opening to a recess or a harness structure. Preferably a given connection means (e.g. the reciprocal connection means) is shaped to extend across the body of the other item to which it is to connect (e.g. the headwear member) when received e.g. by a surface formation in a channel formed on the other item in connection therewith so as to extend along the direction in which that surface formation (channel) extends across the other item when push-fitted thereto. This allows the received given connection means to abut against or urge against the surface formation (channel) in a direction transverse to it and the other item generally towards the body of the other item (e.g. headwear member) in use. Thus, e.g. a channel or protusion across a surface permits an extended interface between connection means without extending into the body of either to a great extent (e.g. as a hole would require) and enable firm fixture without holes.

Most preferably, the headwear connection means and the reciprocal connection means are mutually shaped to permit the one to form an interference fit with the other when the two are connected. A friction fit and/or a snap-fit are preferable, and most preferably this also permits the attachment means to be detachable from the headwear member without being loosely connected thereto.

Preferably, the reciprocal connections means is shaped to extend from the body of the headwear member across the body of the headwear member generally in the direction in which a surface formation (e.g. channel wall ridge) of the headwear connector means generally extends across the headwear member.

The headset apparatus may also include said article, being a signal conduit means (e.g. electrical cable, optical fibre etc) connected to the attachment means for conveying (e.g. electrical) signals to/from the attachment means, or being a headset retention apparatus connected to the attachment means for retaining the headset about the head of the user. The article or articles may be one or more of a communication apparatus (e.g. microphones, transducers, speakers, switching apparatus, junction boxes etc) contained in or connected/attached to the attachment means. The article(s) may include a microphone boom arm attached to the attachment means and carrying thereon a microphone apparatus. Of course, it is most preferable that each/ay such communications apparatus is electrically connected to said signal conduit means for conveying communications signals thereon.

The attachment means may contain an electrical signal conduit junction means (e.g. a junction box) having a given one or more electrical signal ports electrically connected to a plurality of other electrical signal ports for conveying electrical signals from the given signal ports to one or more of the other electrical signal ports, and vice-versa. Thus, where the article is one or more electrical items (e.g. transducers, microphones, earphones) the signal conduit junction means is preferably arranged to connect to each of said items via a respective one of the plurality of other signal ports and to provide a signal output port from the attachment means using one or more of the given signal ports).

Preferably a signal input/output cable is attachable, or electrically connectable, to the given signal port(s).

Preferably, the headset apparatus contains two headwear members (e.g. two earshells, one for each of the user's ears) and each headwear member most preferably has a surface formation shaped to permit the attachment means to be push-fitted thereto. Thus, a headset may be provided comprising only one earshell/cover, or providing two earshells/covers.

The headset apparatus may include a further e.g. a second) headwear member shaped and arranged to be worn about the head of a user and having a surface portion shaped to define a further headwear connection means, most preferably the reciprocal connection means (or another reciprocal connections means) of the attachment means is shaped to reciprocally correspond with a shaping of the surface portion of the further headwear connection means to allow the further headwear connection means and reciprocal connection means to push-fit together thereby to connect the attachment means to the further headwear member without penetrating the surface of the further headwear member. Thus, the attachment means may be operable to fit to each of two or more headwear members, such as each one of as set of two earshells/covers.

It is most preferable, in order to increase the versatility of the headset apparatus, that the attachment means includes reciprocal connection means which are not only shaped to fit to a corresponding surface shaping in either of two headwear means (e.g. left and right earshells), but which is/are shaped to permit the attachment means to maintain the same orientation relative to the headset apparatus as a whole irrespective of which one of the two headwear members it is attached to. This enables the attachment means to be worn on either the user's left-hand side or right-hand side. Furthermore, it may be preferable that the surface formation defining a given headwear connections means defines a shape which is symmetrical across or about at least one axis generally transverse to the direction in which the attachment means push-fits to the headwear member. The reciprocal connection means of the attachment means may be in the form of a harness shaped to push-fit over the headwear connection means from one side of the harness and to push-fit over the further headwear connection means from the other side of the harness. In this way the orientation of the harness is not required to be altered in order to allow the harness to fit to either of the headwear connection means and the further headwear connection means.

The reciprocal connection means is preferably arranged to connect to the connection means of either one of the headwear means and the further headwear means to place the attachment means in the same orientation relative to the headset in use. This enables articles connected to the attachment means to retain their orientation (e.g. forward-facing) relative to the head of the user irrespective of which of the headwear means the article is attached to. For example, a microphone attached to an earshell via a given attachment means may retain its forward-facing orientation adjacent a user's face.

Thus, in one of its aspects, the invention may provide headset apparatus to be worn about the head of a user may include: a headwear member and a further headwear member each shaped and arranged to be worn about the head of a user and each having a surface portion shaped to define a respective headwear connection means; attachment means for attaching an article to the headwear member and for attaching an article to the further headwear member, and having a reciprocal connection means shaped to reciprocally correspond with a shaping of a surface portion defining the respective headwear connection means to allow the headwear connection means and reciprocal connection means push-fit together thereby to connect the attachment means to the surface of either one of the headwear member and the further headwear member to place the attachment means in the same orientation relative to the headset in either case without penetrating said surface.

Preferably, each of two sides (e.g., opposite sides) of the attachment means has a reciprocal connection means shaped to reciprocally correspond with a shaping of the surface portion defining a respective one (or each) of the respective headwear connection means. For example, each one of said two (e.g., opposite) sides of the attachment means may present a respective reciprocal connection means having substantially the same shaping as that of the reciprocal connection means presented by the other said side of the attachment means.

Each one of the two reciprocal connection means may be positioned about the attachment means such that an axis of the attachment means along which the reciprocal connection means may be push fitted to the headwear member, is substantially parallel to an axis of the attachment means along which the other reciprocal connection means may be push fitted to the further headwear member. The aforesaid axes may be collinear.

The two reciprocal connection means may together define a single continuous shaping (e.g., a through-hole).

The headset apparatus may also include a further attachment means (e.g., such as is described above) for attaching an article to an aforesaid headwear member having reciprocal connection means shaped to reciprocally correspond with a shaping of the surface portion defining an aforesaid headwear connection means to allow the headwear connection means and further reciprocal connection means to push-fit together thereby to connect the further attachment means to the surface of the headwear member without that surface being penetrated. Thus, articles may be attached to each of two or more headwear members using dedicated separate attachment means.

In this way, a complete headset assembly may be provided including not only two headwear members (e.g. two earshells) but also two corresponding attachment means for use in attaching articles separately to either one of the two headwear members.

The attachment means may be connected to the further attachment means.

For example, the first attachment means may be connected to the further attachment means by way of a resiliently deformable brace of limb shaped to receive the head of a user and arranged to urge against opposite sides of a user's head by action of the resilient deformation thereof. In this way, a head brace or neck band may connect the first and second attachment means and may serve as a headwear retention device for retaining the attachment means, and the headwear members (earshells) connected to them, to the head of the user. Alternatively, where the attachment means carry articles such as electrical signal conduits (e.g. for use in communications headsets), then the attachment means and the further attachment means may be connected via a signal conduit cable for conveying electrical signals between the two attachment means in use.

Preferably, the further reciprocal connection means is arranged to connect to the connection means of either one of the headwear means and the further headwear means to place the further attachment means in the same orientation relative to the headset in use.

An aforesaid reciprocal connection means may define an aperture through which an aforesaid headwear connection means is shaped to extend, for example.

The headset apparatus may include communications means connected to an aforesaid attachment means for attachment to an aforesaid headwear member thereby, and means for conveying from the headset apparatus via the attachment means electrical communications signals generated by the communications means.

For example, the headset apparatus may provide an aforesaid headwear member arranged to be worn against the head of a user to cover an ear of the user.

An aforesaid headwear member may preferably be integrally formed with its headwear connection means.

An aforesaid attachment means may include an articulation portion via which said article is connected to the reciprocal connection means in use and which is moveable relative to both the headwear member and the reciprocal connection means when the headwear member is fitted to the reciprocal connection means thereby to permit movement of the article relative to both the headwear member and the reciprocal connection means when attached to the headwear member in use. This feature also represents another invention and further aspect of the present invention separate from, and combinable with any other aspect of the invention discussed herein.

For example, where the article in question is a head strap or a head band/neck band via which the headset apparatus is to be retained on the user's head, the articulation portion permits the headwear means (e.g. earshells) to be moved/adjusted in their position relative to the head strap/neck band etc.

Preferably the articulation portion includes a resiliently deformable member rigidly connected to and extending from the reciprocal connection means and being arranged to permit said relative movement of said article connected to the attachment means in use by resilient deformation of the articulation portion.

The articulation portion may include a first articulation limb which is resiliently joined to a second articulation limb of the articulation portion at a join therebetween such that the first articulation limb may be moved from its quiescent position relative to the second articulation limb by resilient flexure and/or torsion of either limb and/or of the join therebetween.

The second articulation limb preferably extends from the first articulation limb in a direction generally transverse to the direction in which the first articulation limb extends.

The articulation portion may include a third articulation limb which is resiliently joined to the second articulation limb at a join therebetween such the third articulation limb may be moved from its quiescent position relative to the second articulation limb by resilient flexure and/or torsion of either limb and/or of the join therebetween, preferably the third articulation limb extends from the second articulation limb in a direction generally transverse to the directions in which the first and second articulation limbs respectively extend.

The headset apparatus may include said article, being a head-strap means for extending across a part of the head of a user thereby to strap the headwear member to the head of the user, and the head-strap means is preferably attached to the articulation portion of an aforesaid attachment means.

The head-strap means may be attached to any one, some or all of the first and second and third articulation limbs.

The first, second and third articulation limbs are preferably collectively arranged to extend in respective directions which are substantially coplanar.

The articulation portion may be integrally formed with the reciprocal connection means.

The attachment means may define a harness shaped to embrace the headwear connection means of an aforesaid headwear member. The harness may be shaped to surround peripheral parts of said headwear member.

The harness may be shaped to fit within one or more channel(s) formed in the surface of the headwear member by the headwear connection means thereof.

The harness preferably includes connector means to which e.g. a retention strap is connectable and from which the strap may extend across a part of the head of a user thereby to strap an aforesaid headwear member to the head of the user. Most preferably the strap connector means is defined by a portion of the harness shaped to be raised and separated from the surface of the headwear member when the harness is fitted thereto, thereby to enable an article (e.g. the strap) to pass between the strap connector means and the surface of the headwear member over which the connector means is raised thereby to permit attachment of the strap thereto.

The harness preferably defines a resiliently deformable collar member shaped and arranged to urge against opposing peripheral parts of the headwear member defining the headwear connection means thereof when fitted thereto. Most preferably the harness is symmetrically shaped about a line/axis such that the harness presents the same shape or profile to the headwear member when rotated through 180 degrees about that line/axis. This permits the same harness to be used on either a left-hand earshell and a right-hand earshell.

Preferably, an aforesaid reciprocal connection means is shaped to fit to an aforesaid headwear connection means substantially to prevent movement of the reciprocal connection means relative to the headwear connection means being other than the relative movement via which the reciprocal connection means is detachably attachable to the headwear connection means.

The headset apparatus may include locking means arranged to engage with an aforesaid headwear apparatus and/or an aforesaid attachment means of the headset to retain the aforesaid attachment means connected to the headwear member when the two are fitted together.

The locking means is preferably arranged to prevent movement of an aforesaid reciprocal connection means relative to an aforesaid headwear connection means being the relative movement via which the reciprocal connection means is detachably attachable to the headwear connection means.

The headset apparatus may, in the present or in another aspect of the invention include the aforesaid article being a cable, and in which an aforesaid headwear member includes a cable stowage member which projects therefrom and is located adjacent the headwear connection means so as to project over a part of the reciprocal connection means when fitted to the headwear connection means in use thereby to define therewith a stowage channel dimensioned to stow portions of the cable. This feature also represents another invention, separate from or combinable with, any other aspects of the invention discussed herein.

Preferably, the width of the stowage channel is dimensioned to substantially match the width of the cable. More preferably, the depth of the stowage channel is dimensioned to be equal to or greater than the width of the cable.

The depth of the stowage channel may be dimensioned to be equal to at least twice the width of the cable.

Preferably, the headwear member defines a body having headwear signal conduit means embedded therein and extending through a part of the body of the headwear member from one surface part of the body to a different surface part thereof so as to provide a conduit for electrical headwear signals through the body part between the different surface parts. This feature also represents another invention, separate from and combinable with, any other aspects of the invention discussed herein.

The headwear signal conduit means is preferably an electrically conductive element embedded directly within the body of the headwear member.

The body of the headwear member is preferably formed by molding and the headwear signal conduit means is embedded within the body by the molding.

Preferably, the headwear signal conduit means is exposed at a surface part of the headwear member adjacent or within the surface portion of the headwear member defining the headwear connection means, and the attachment means includes signal conduit means arranged to make electrical contact with the headwear signal conduit means when connected to the surface of the headwear member thereby to permit electrical signals to be conveyed between the between the headwear member and the attachment means.

Preferably, the headwear member is arranged to be worn over an ear of the user and includes electrical communications means for providing audible signals to the ear of the user generated thereby from electrical signals conveyed thereto from the attachment means via said headwear signal conduit means.

The headwear member is preferably arranged to be worn over an ear of the user and includes electrical communications means for providing audible signals to the ear of the user generated thereby from electrical signals.

In another of its aspects, the present invention may provide a headset apparatus substantially as described above. The invention in its aspects described above epitomises a method of attaching an article to a headwear member in a headset apparatus, and it is to be understood that the invention in other aspects thereof, provides such a corresponding method.

Accordingly, for example, in one of its aspects, the present invention may provide a method of attaching an article to a headwear member in a headset apparatus (e.g. a communications headset containing communications means) to be worn about the head of a user the method including: providing a headwear member shaped and arranged to be worn about the head of a user and having a surface portion shaped to define a headwear connection means; providing attachment means for attaching an article to the headwear member having a reciprocal connection means shaped to reciprocally correspond with a shaping of the surface portion defining the headwear connection means (e.g. which shaping extends along the surface of the headwear member); push-fitting the headwear connection means and reciprocal connection means together thereby to connect the attachment means to the surface of the headwear member (e.g. so as to extend thereacross) without penetrating said surface. Additional features of the headset apparatus described above epitomise corresponding additional features of the corresponding method of attaching an article to a headwear member.

In yet another of its aspects, the present invention may provide a communications headset apparatus to be worn about the head of the user, including communications means (e.g. for conveying electrical communication signals or the like), a headwear member (e.g. an earshell or earcup), and an attachment member arranged to be detachably attachable to a part of the headwear member outwardly facing of the user in use, wherein some or all of the one or more said communications means are attached to the attachment member only, and are attachable to the headwear member via the attachment member. It is to be understood that the manner via which the attachment member attaches to the headwear member may be such as is set out in any of the aspects of the present invention discussed above. The communications means may include electrical/optical signal conduit cables, transducer means (e.g. acoustal-electrical transducers such as speakers), a Boom arm for a Boom microphone, microphone circuit boards, electronic chips, junction boxes and switching devices.

In a further of its aspects, the present invention may provide a manual switch apparatus to be worn about the body of a user including: a switch box means having a body with a manually operable switch device for controlling the operation of a remote communications apparatus; a support means having attachment means for attaching the support means about the body of a user, the support means being shaped to releasably receive at least a part of the body of the switch box means thereby to selectively retain the switch box means in either of two different positions in which the orientation of the switch device relative to the support means is substantially reversed as between said two positions.

Preferably, the at least a part of the body of the switch box means arranged to be received by the support means is substantially symmetrical as between said two positions, and the support means is shaped to reciprocally correspond with the shaping of the part of the switch box thereby to intimately fit in abutment therewith when the part is received in either of the two positions.

The connection means may define a platform member upon which the switch box means is arranged to be supported when the at least a part of the switch box means is received by the support means.

The connection means preferably defines a recess shaped to receive at least a part of the switch box means.

The manual switch apparatus preferably includes a signal conduit cable(s) extending from the body of the switch box means such that in either one of the two different positions the orientation of the signal conduit cable(s) relative to the support means is substantially reversed relative to the other of the two different positions.

Preferably, the location(s) on the switch box body from which the signal conduit cable(s) extend is positioned in one of the two different positions and the manually operable switch device is located on the switch box body to be positioned in the other of the two different positions when the at least a part of the switch box is received by the support means.

Preferably, the attachment means is arranged to attachment to an item of apparel of the user. It is to be understood that the manual switch apparatus described above epitomises a method or methods of supporting/attaching a switch box and it is to be understood that the invention in other aspects thereof, provides such a corresponding method. Thus, for example, in a further of its aspects, the present invention may provide a method of wearing a manual switch apparatus about the body of a user, the method including: providing a switch box means having a body with a manually operable switch device for controlling the operation of a remote communications apparatus; providing a support means having attachment means for attaching the support means about the body of a user; providing the support means shaped to releasably receive at least a part of the body of the switch box means; selectively retaining the switch box means in either of two different positions in which the orientation of the switch device relative to the support means is substantially reversed as between said two positions.

There now follows a description of examples of the present invention with reference to the accompanying drawings in which.

Figure 1:
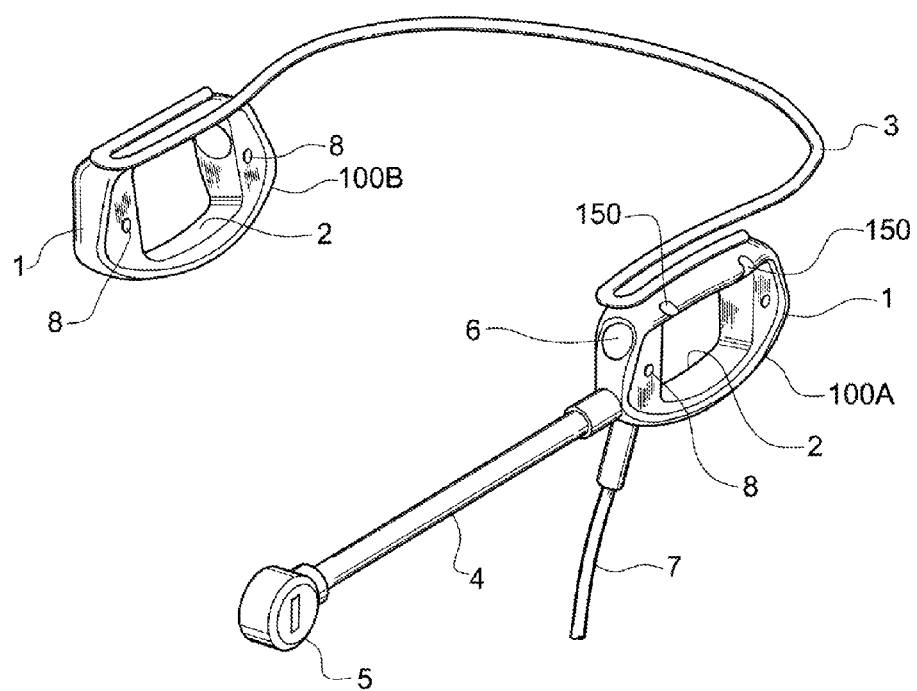
FIG. 1 illustrates a pair of attachment harnesses for a headset apparatus, the attachment harnesses carrying communications apparatus and being connected together via an electrical signal conduit cable.
Figure 2:
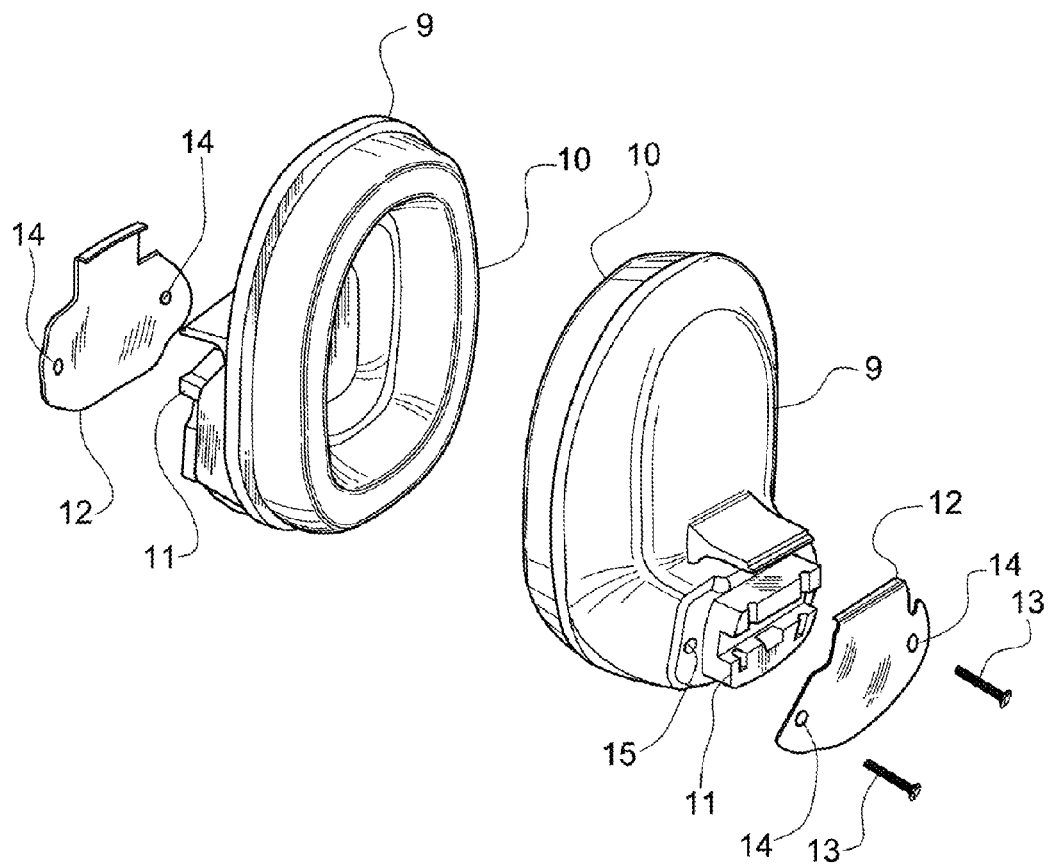
FIG. 2 illustrates a pair of earshells arranged to receive the pair of attachment harnesses of FIG. 1.
Figure 3:
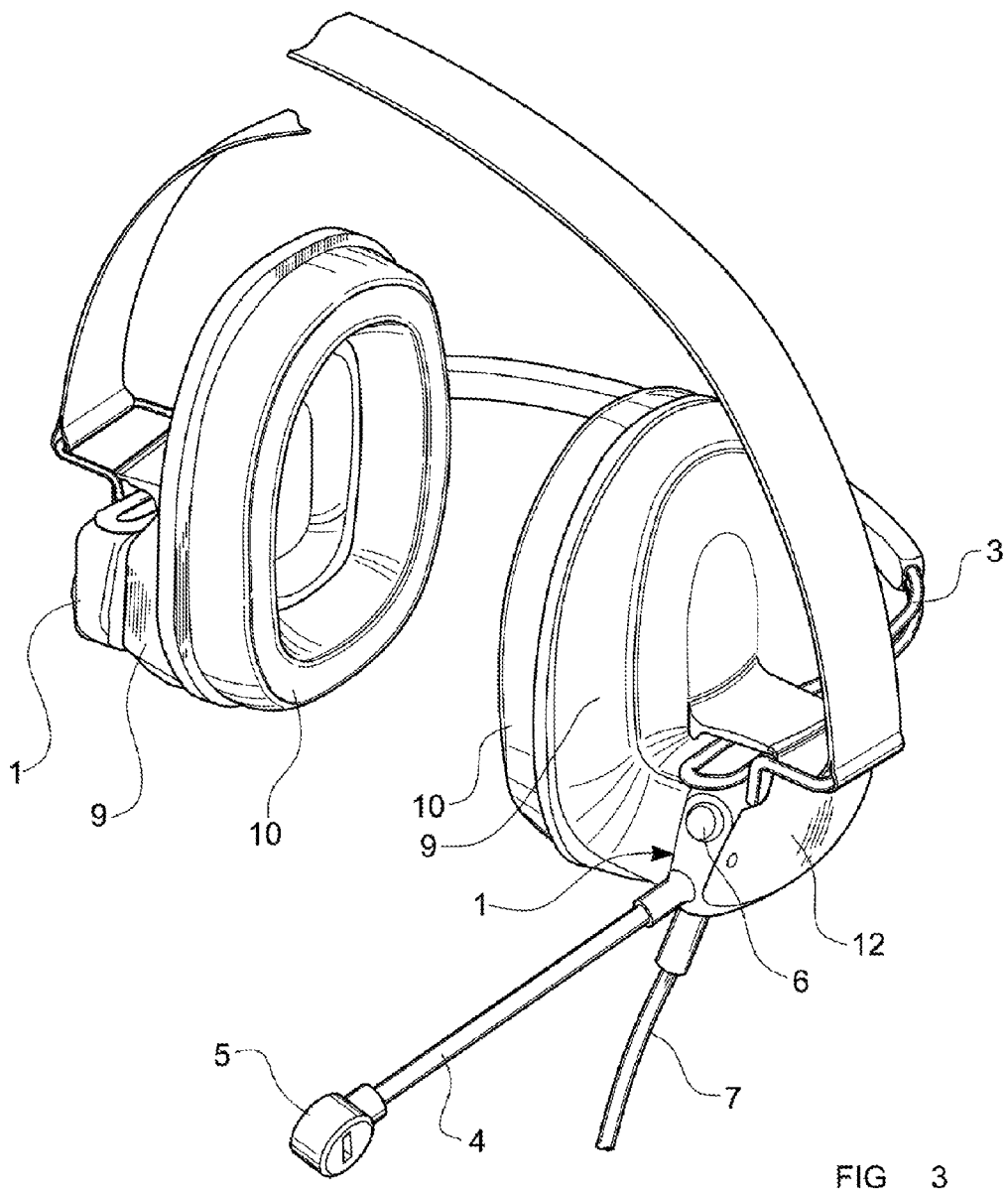
FIG. 3 illustrates a headset including a pair of earshells of FIG. 2 to each of which is attached a respective one of the pair of attachment harnesses of FIG. 1, a head-strap and a neck band are attached to the pair of harnesses.
Figure 4:
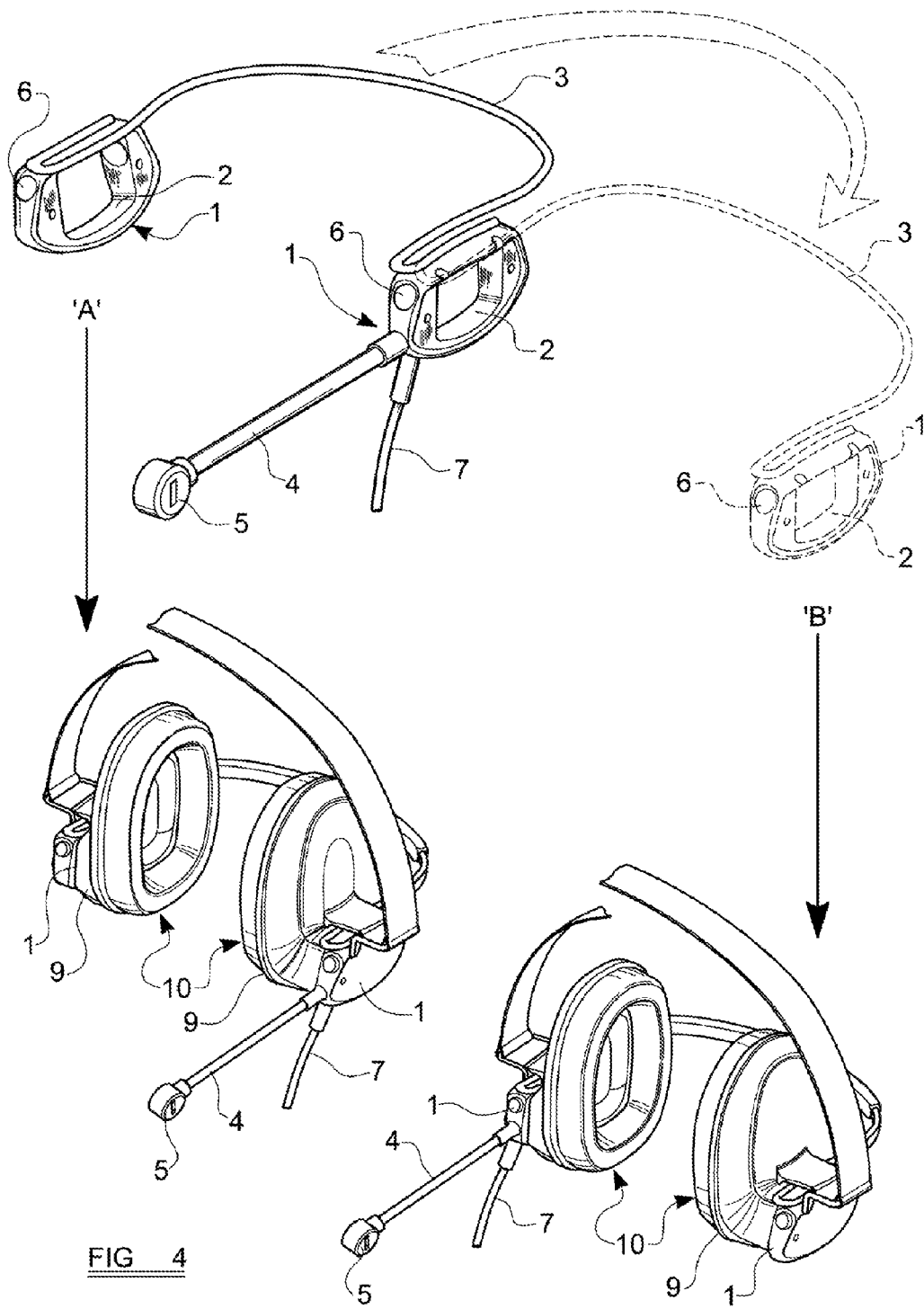
Figure 5:
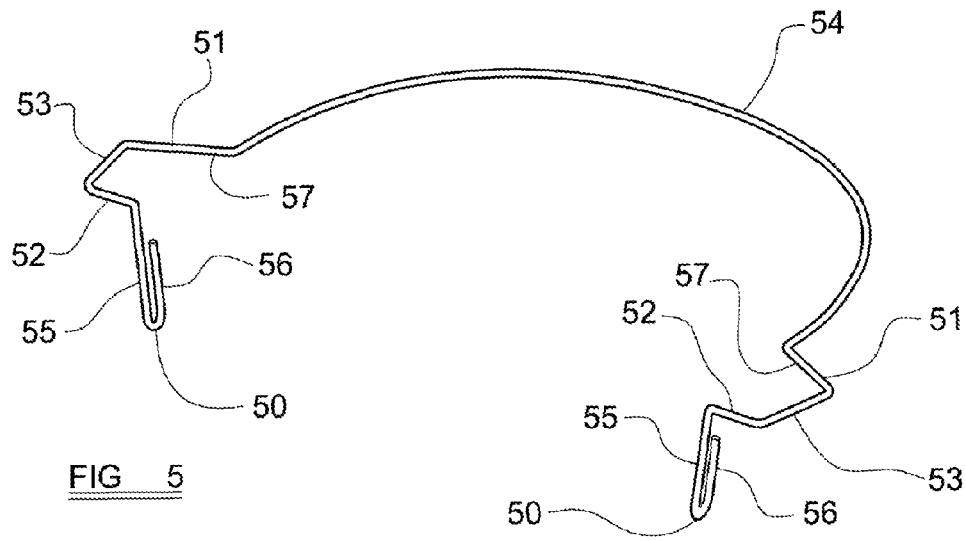
Figure 6:
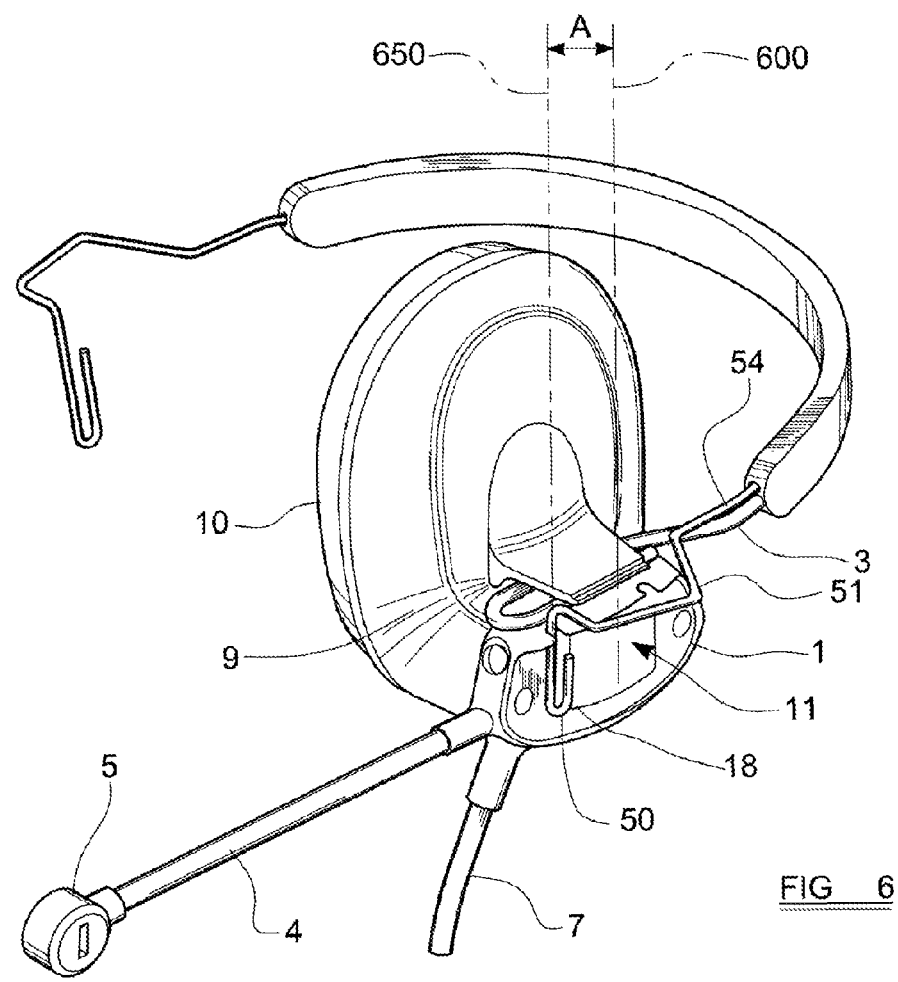
Figure 7:
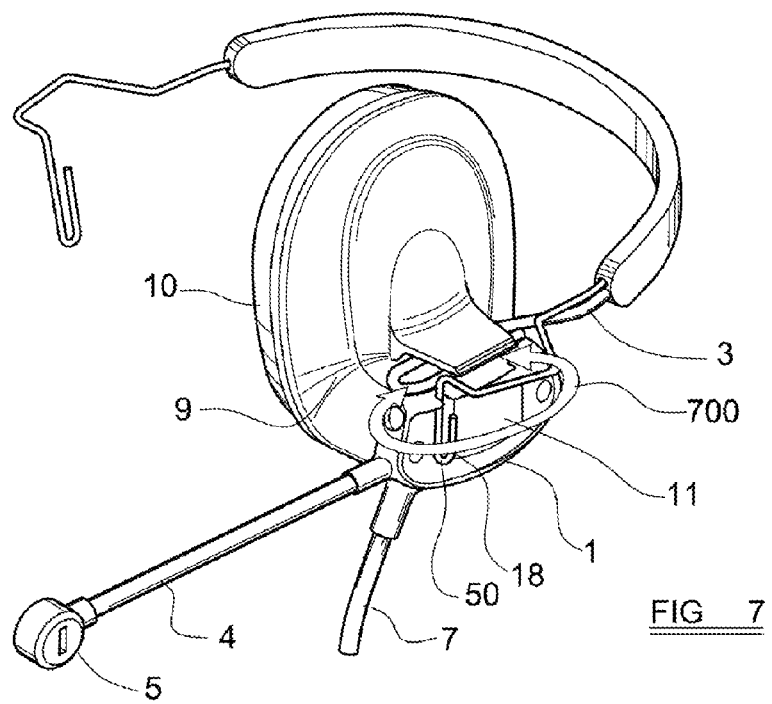
Figure 8:
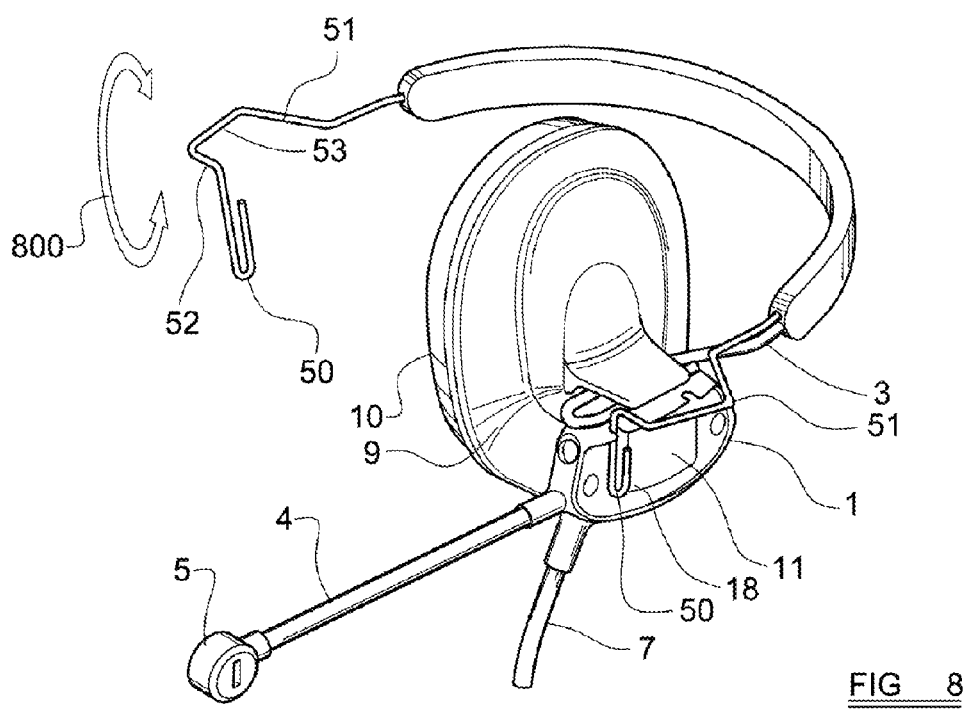
Figure 9:
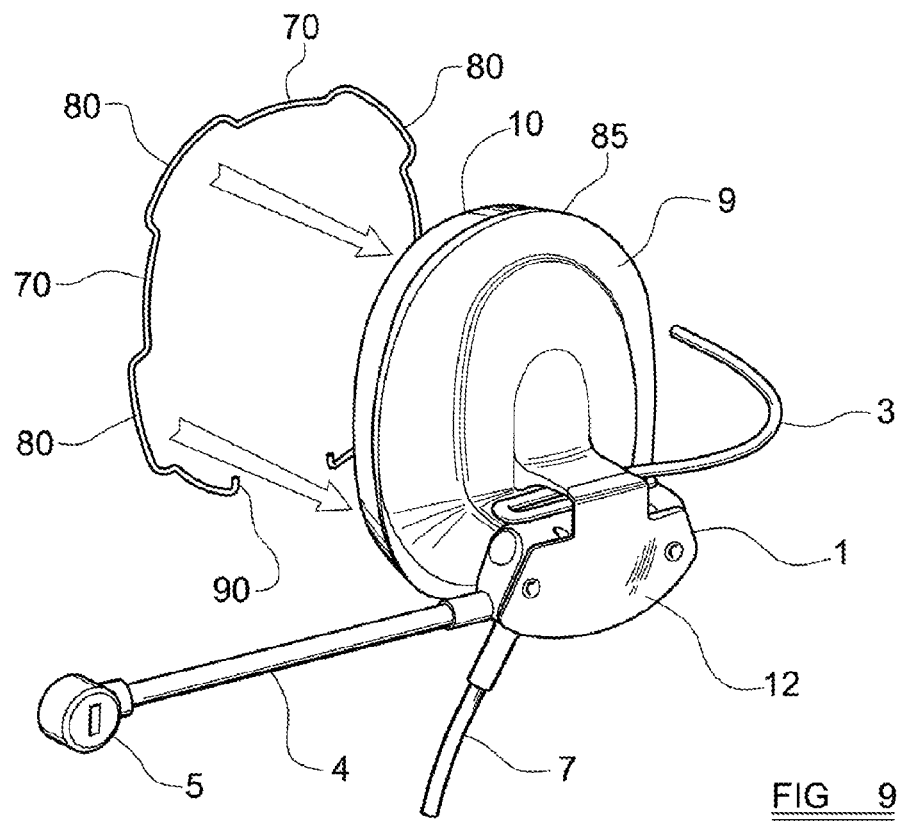
Figure 10:
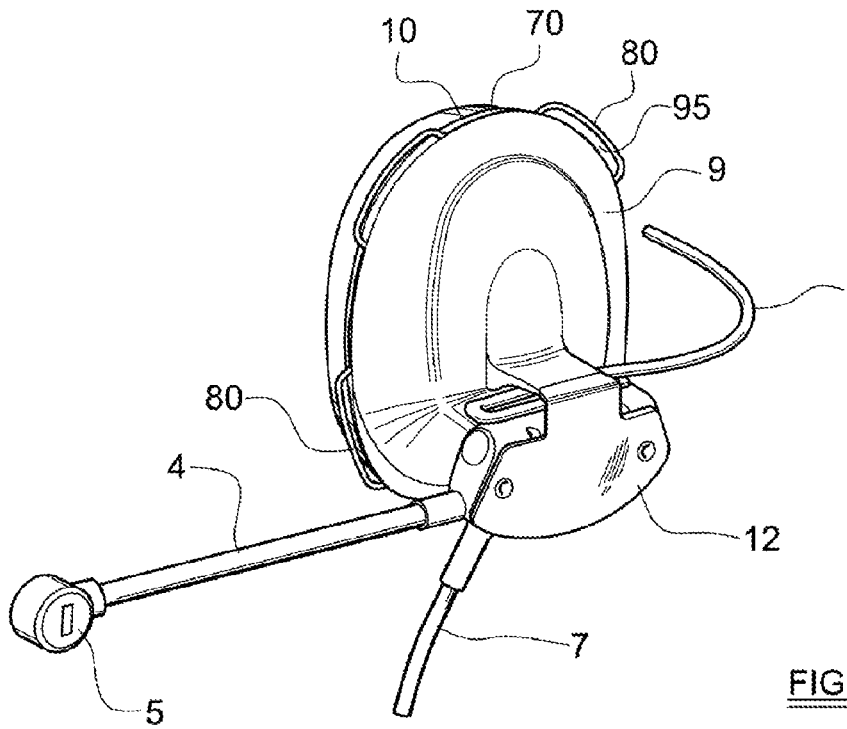
Figure 11:
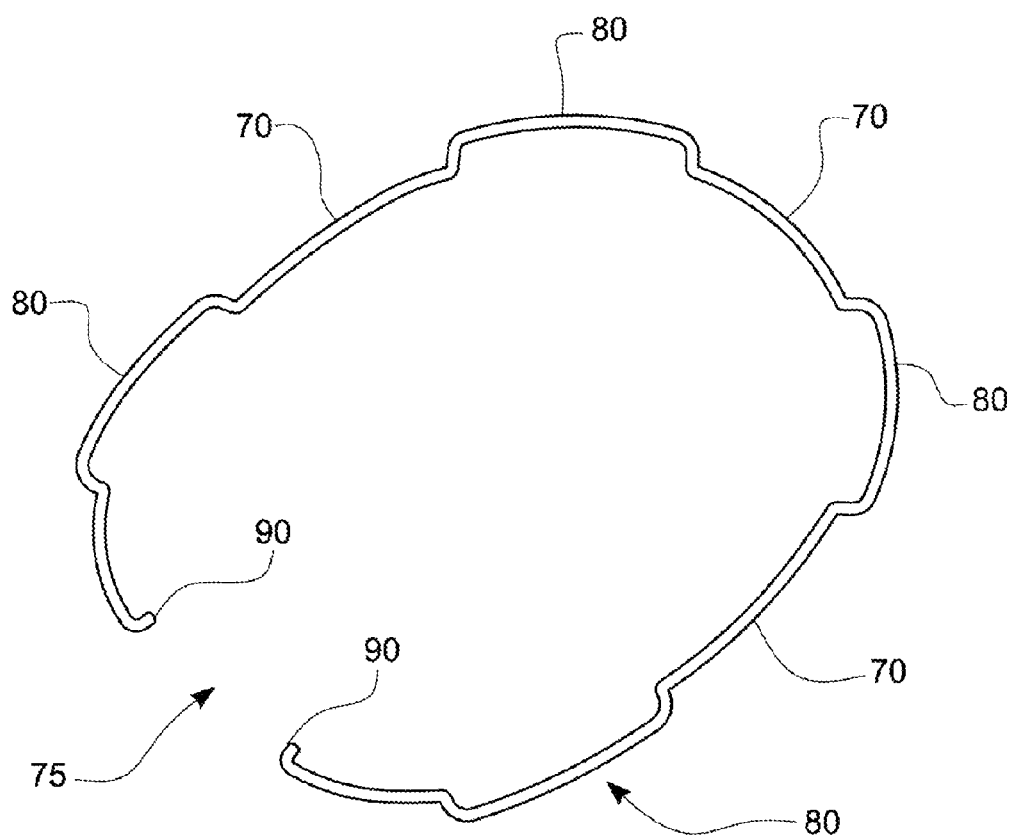
Figure 12:
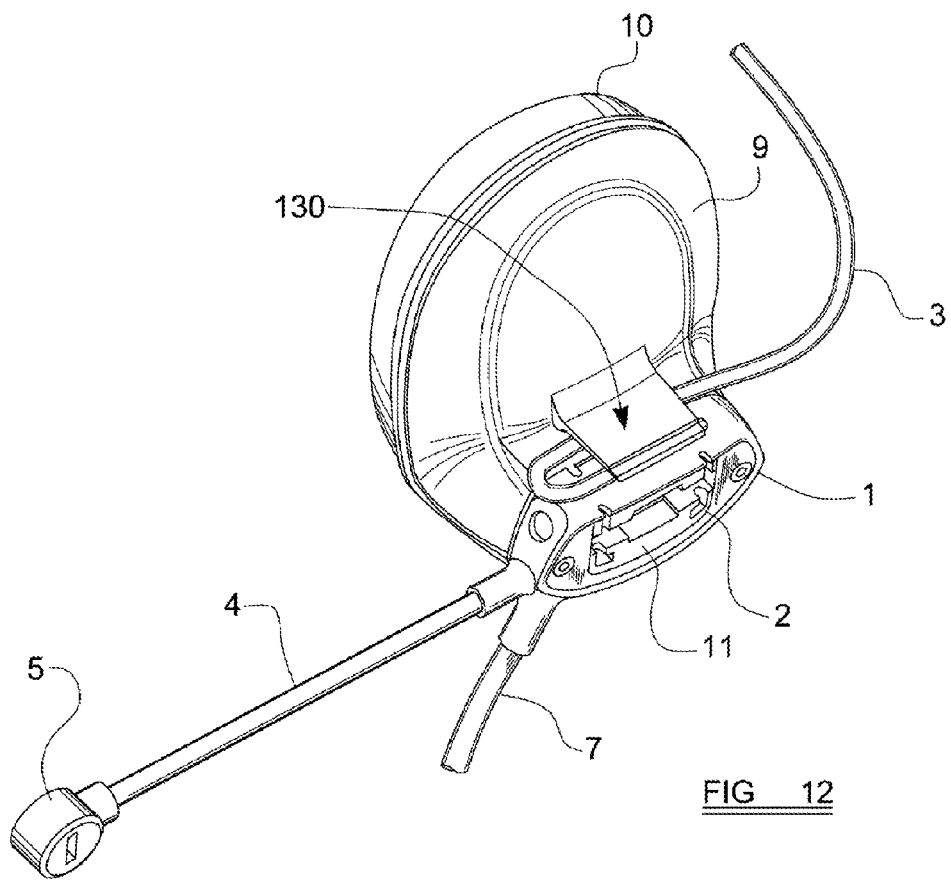
Figure 13:
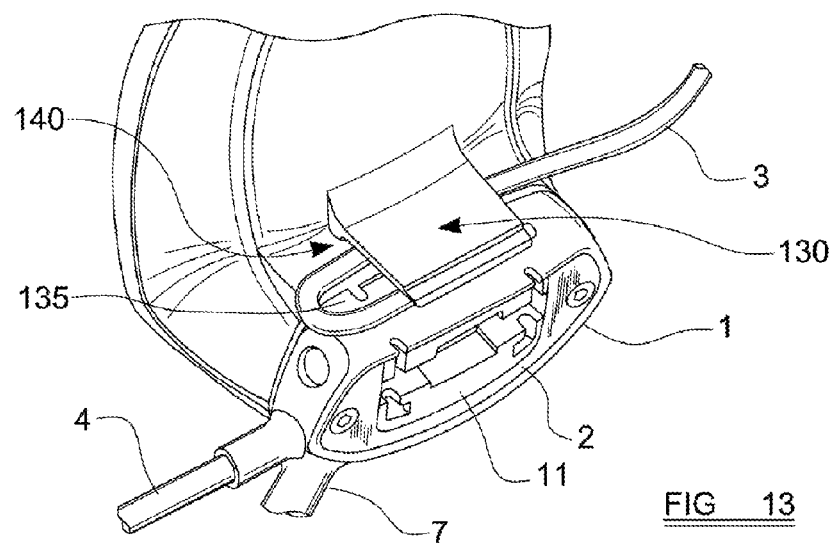
Figure 14:
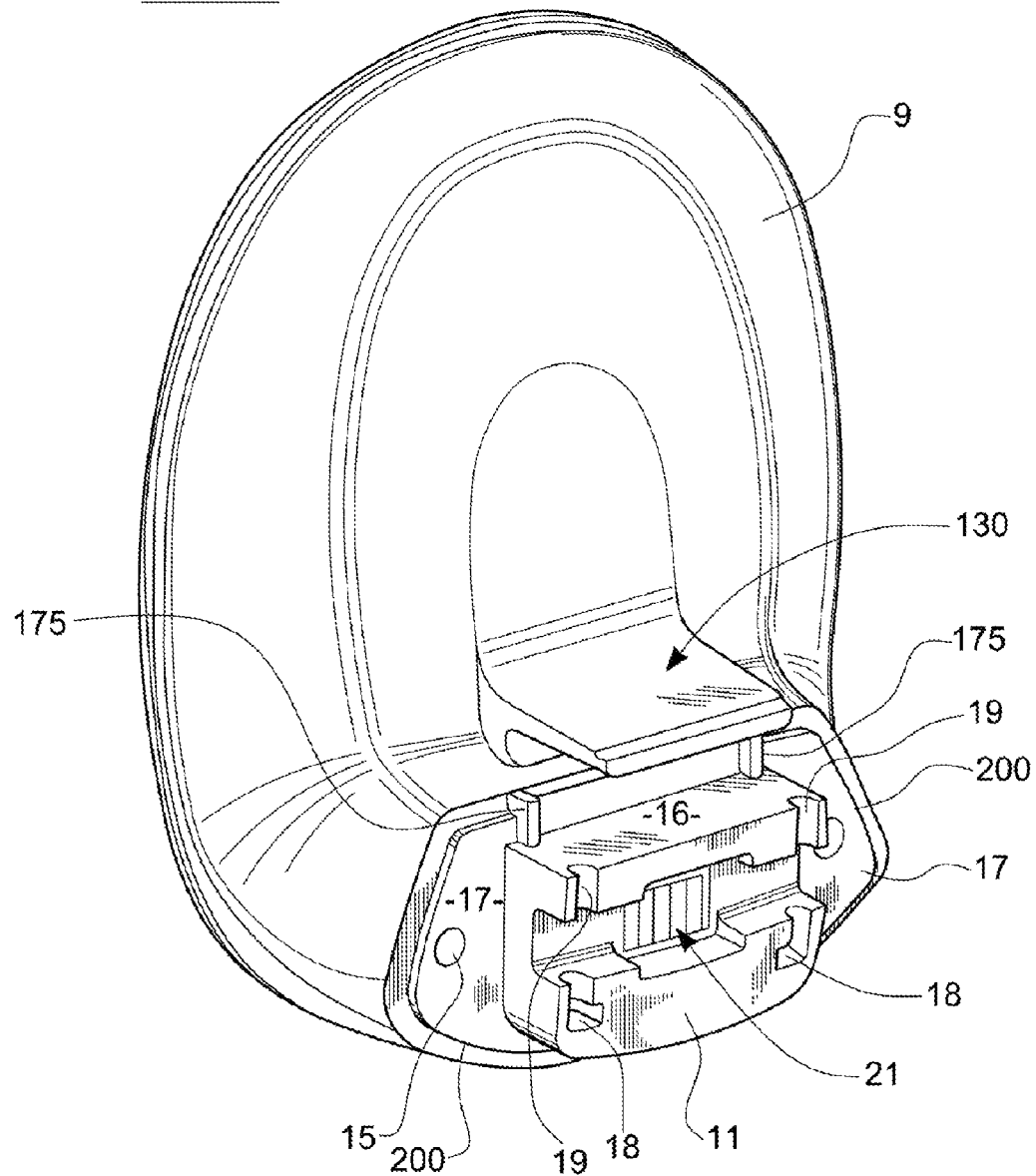

FIG. 4 schematically illustrates the reversibility of positioning of the harnesses of FIGS. 1 and 3 relative to the pair of earshells of FIGS. 2 and 3 conserving the orientation of harnesses;

FIG. 5 illustrates a harness joining, and integrally formed with, a pair of attachment members so as to form a neck band for receiving the lower head or neck of a user in use;

FIG. 6 illustrates the harness of FIG. 5 connected to a surface formation of an earshell as illustrated in FIGS. 2 to 4 via a reciprocally shaped attachment member;

FIG. 7 illustrates the arrangement of FIG. 6 and indicates the direction of a tortional movement of the harness relative to the attachment member;

FIG. 8 illustrates the arrangement of FIG. 6 and indicates a direction of a flexing movement of the harness relevant to the attachment member;

FIG. 9 illustrates a peripheral attachment harness arranged for attachment to a surface formation of an earshell;

FIG. 10 illustrates the attachment harness and earshell of FIG. 9 in assembled form;

FIG. 11 illustrates the harness of FIGS. 9 and 10;

FIG. 12 and FIG. 13 illustrate an earshell and attachment harness;

FIG. 14 illustrates a surface formation in an earshell defining an attachment member for attachment of a harness thereto.

Figure 15:
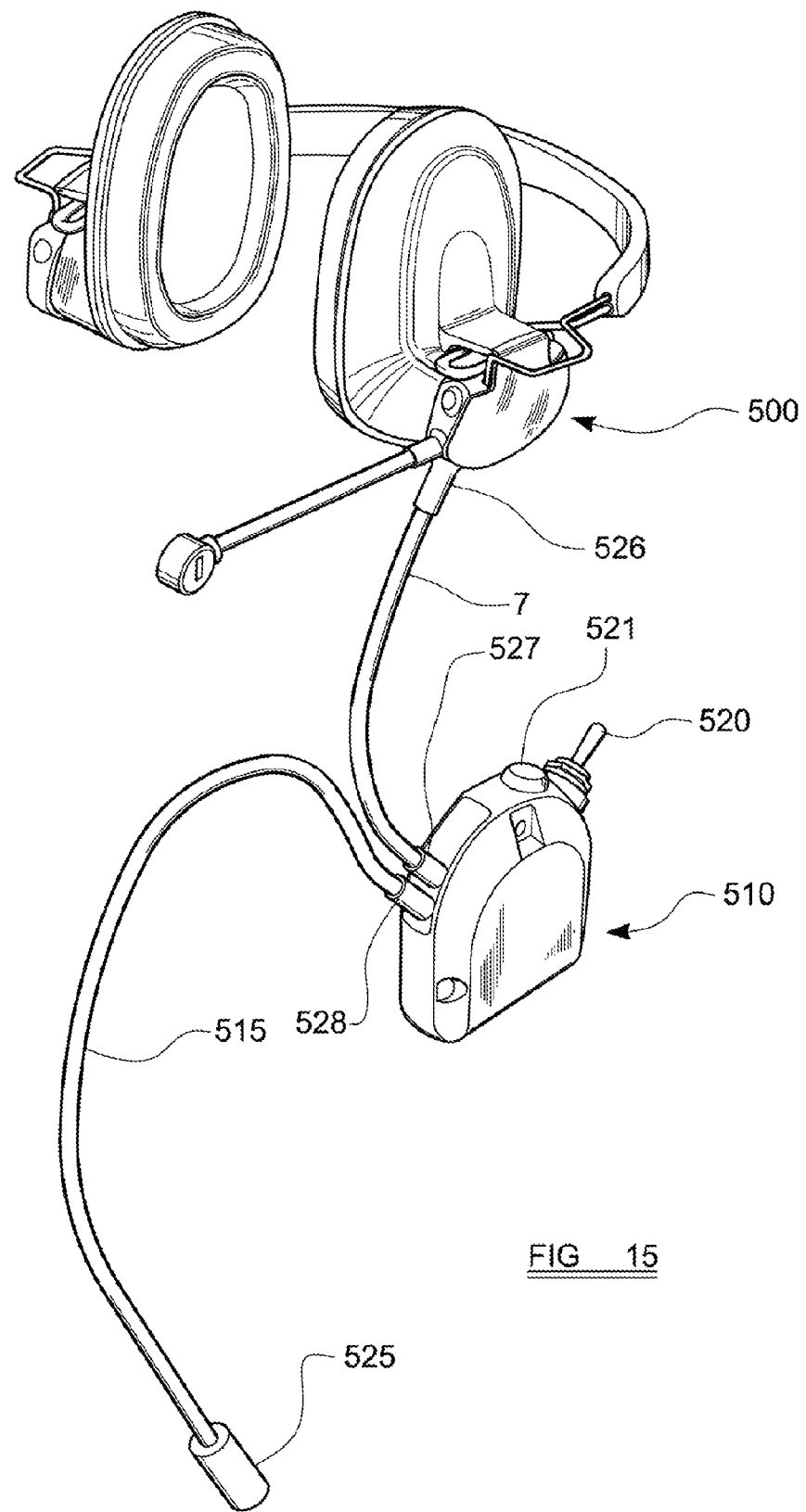
Figure 16:
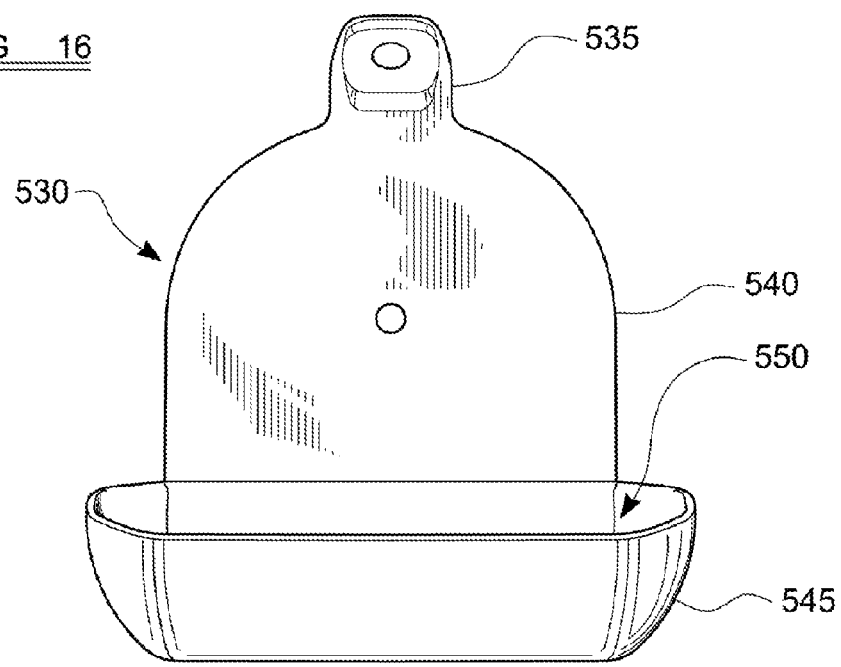
Figure 17:
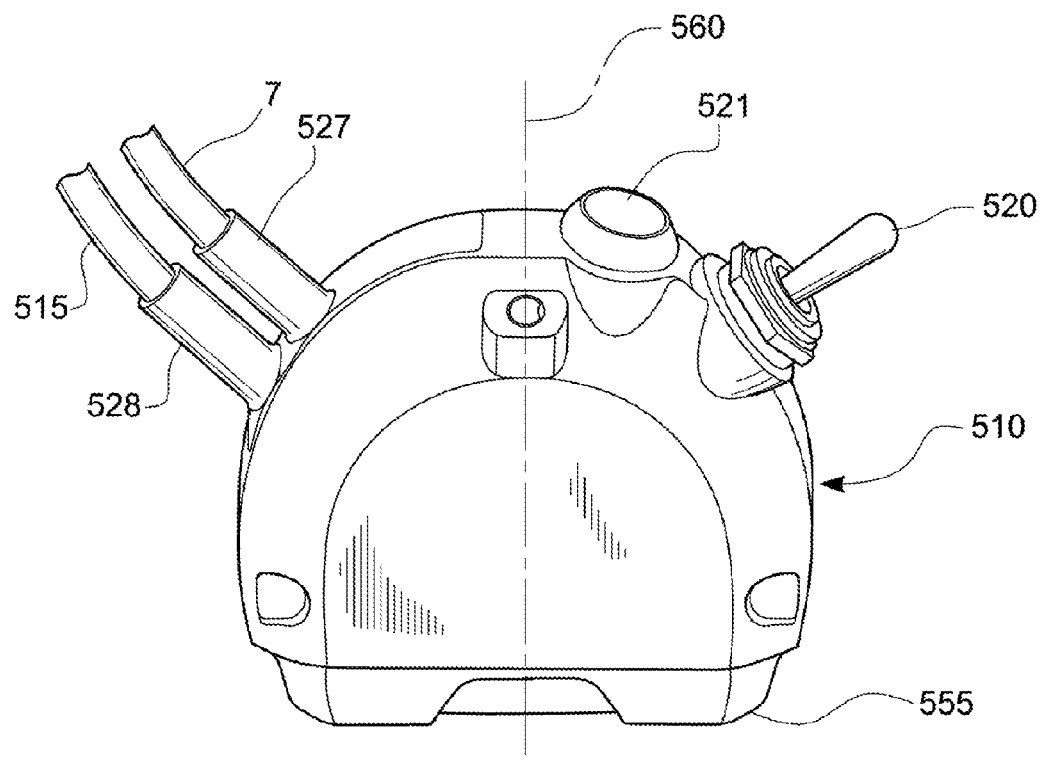

FIG. 15 illustrates a communications headset to which is connected a headset connector cable along which is located a switchbox;

FIG. 16 illustrates a support platform for a switchbox;

FIG. 17 illustrates the switchbox of FIG. 15 in greater detail;

FIG. 18a and FIG. 18B illustrate the switchbox of FIG. 17 in each one of two opposite orientations;

FIG. 19 schematically illustrates the positioning of the switchbox of FIG. 17 in each of the two different orientations thereof illustrated in FIG. 18A and FIG. 18B.

Referring to FIG. 1, there is illustrated a pair of attachment harnesses (1) each shaped to define an opening (2) passing through the body of the harness and being accessible from opposite sides thereof. The two harnesses of the pair are substantially identical and the following description of the features of one harness of the pair applies equally to the same-numbered features of the other harness of the pair.

In passing through the body of the harness, the opening (2) extends from one side of the harness to an opposite side thereof. At each such side of the harness is formed a harness ridge (100A, 100B) which substantially circumscribes the periphery of the opening (2) as it appears at the side of the harness in which the respective harness ridge is formed. Thus an outward harness ridge (100A) circumscribes the periphery of the opening (2) which faces outwardly of the head of the user in use, while an identically shaped inner harness ridge (100B) on the opposite side of the harness (1) circumscribes the periphery of the opening (2) which faces towards the head of the user in use. Each harness ridge (10A, 100B) extends from the body of the respective harness generally along the direction in which the harness (1) is moved when push-fitted to an earshell member as discussed below.

Recesses (150) are formed within each harness ridge and are shaped so as to intimately receive reciprocally shaped formations in the surface of an earshell to which the harness is arranged to be attached. Through-holes (8) pass through the body of each harness member (1) and are dimensioned to receive screws which engage with blind screw holes (15) formed within (but not penetrating through) the body of the earshell in question.

A microphone (5) is connected to one of the harnesses via a boom arm (4) containing electrical signal conduit means which pass from the microphone along the boom arm and into the body of the harness to which the boom arm is connected. A separate microphone (6) is embedded within a recess formed in the body of the harness means carrying the boom arm being insulated from immediate contact with the internal surface of the recess within which it is embedded by means of a rubber cushion surround which serves to attenuate acoustical noise propagating through the body of the harness thereby substantially acoustically isolating the embedded microphone (6) from the body of the harness in which it is embedded. A similar embedded microphone (and method of embedding) may be provided in the other of the two harnesses illustrated in FIG. 1.

An electrical signal input/output conduit (7) is connected to the body of the harness which carries the boom arm (4) and serves as the means via which electrical signals are conveyed to and from electrical components carried by or within either or both of the harnesses of FIG. 1. An electrical signal junction box (not shown) is provided with the body of at least the harness to which the input/output signal cable (7) is connected. The signal junction box contains one or more input/output electrical signal ports directly electrically connected to the input/output cable (7) and electrically connected to a plurality of other electrical signal ports for conveying electrical signals between the input/output signal cable (7) and one or more of the other electrical signal ports. These other electrical signal ports are each connected, respectively, to signal conduit lines extending along the boom arm (4) to the microphone (5) located at the end thereof, to signal conduit lines for conveying signals from the embedded microphone (6) embedded in each of the two harnesses (1). A signal conduit cable (3) is also connected to the signal junction means and extends from the harness containing the junction box to the other harness of the pair whereat it electrically connects to electrical articles attached to or carried by that other harness.

In this way the interconnecting signal conduit cable (3) enables electrical signals to pass between the two harnesses. The interconnecting signal conduit cable (3) is of sufficient length to form a semi-circular shape dimensioned to receive the head of a headset wearer in use.

FIG. 2 illustrates a pair of ear cups to which the pair of harnesses illustrated in FIG. 1 are arranged to be attached in use. Each ear cup comprises an earshell (9), which is shown in greater detail in FIG. 14 (which shall be referred to hereafter), and an annular cushion member (10) attached to the earshell and arranged to be pressed to those parts of the head of the user surrounding the ear which the earshell (9) is designed to simultaneously cover.

In the surface of the earshell (9) intended to face outermost in use is defined a surface formation comprising a projecting portion (11), which projects outwardly of the body of the earshell (9), a circumferential recess (200) circumscribing the projecting portion (11) and outwardly extending lug portions (175) which intersect parts of the circumferential recess (200). Each of these three respective surface formations is shaped in correspondence with the opening (2) extending through the body of a harness, with a circumferential harness ridge (100A, 100B), and with a harness ridge recess (150) respectively. Consequently, the opening (2) of a harness is shaped to reciprocally correspond with the shaping of the sides (16) of the projecting surface formation (11) of the earshell (9) to allow the projecting portion (11) of the earshell and the opening (2) of a harness to push-fit together thereby to connect the harness (1) to the surface of the earshell (9) without requiring the use of a through-hole to achieve such attachment. Similarly, the circumferential harness ridge (10A, 100B) is shaped to reciprocally correspond with the shaping of the circumferential earshell recess (200) to allow the harness ridge and earshell recess to push-fit together thereby to connect the harness and earshell together. Also, the earshell ridge recesses (150) are each shaped to reciprocally correspond with the shaping of a respective lug portion (175) intersecting the circumferential recess (200) of the earshell such that each such lug may be push-fitted into a corresponding harness ridge recess thereby to permit the harness to attach to the surface of the earshell. Thus, it will be understood that each one of these three reciprocating formations provides a means of allowing the harness (1) to push-fit onto the surface of the earshell (9). Each of these corresponding shapings is dimensioned such that the respective push-fit is a close interference fit, and preferably a snap-fit, rather than a loose fit. The cross-section of the projecting portion (11) of the surface formation of the earshell (9), as viewed along the direction in which the harness (1) is arranged to push-fit thereto, has a periphery (defined by surface 16) shaped to match the shape of the periphery of the opening (2) formed in the harness (1). The surface formation of the earshell intermediate the outwardly projecting portion (11) and the circumferential recess (200) is preferably shaped to reciprocally correspond with the shaping of the surface intermediate periphery of the opening (2) of the harness (1) and the circumferential harness ridge (10A, 100B). In this example both intermediate surfaces are substantially flat.

Referring to FIG. 2, a fixing plate (12) is provided which is shaped to cover the outwardly facing parts of the harness (1) when connected to the earshell in use. Fixing screws (13) are provided to extend through apertures (14) formed within the fixing plate (12) and to engage with blind screw-holes (15) formed within (but not penetrating the body of) the earshell. In this way the fixing plate (12) in combination with the fixing screws (13) serves to prevent movement of the harness (1) relative to the earshell (9) in the only direction which would enable detachment of the former from the latter. The surface formation defined by the earshell, and the reciprocally shaped parts of the harness push-fitted thereto, are shaped to prevent rotational movement of the harness (1) relative to the earshell. FIG. 3 illustrates the pair of harnesses of FIG. 1 attached to and fully assembled with the ear cups and accessories illustrated in FIG. 2.

FIG. 4 illustrates the harness pair illustrated in FIG. 1 in each of two opposing orientations relative to the assembled headset apparatus. The headset assembly illustrated in FIG. 3 is also illustrated as one of the two opposite headset assembly configurations illustrated in FIG. 4. Consequently as between FIGS. 1, 3 and 4, like articles are assigned like reference numerals.

An opening (2), a circumferential harness ridge (10A, 100B) and a harness ridge recesses (150) is formed on each one of the two sides of a given harness (1) at which the opening (2) appears. This means that either of those two sides of a given harness may be push-fitted with a reciprocally shaped surface formation of an earshell (9) as discussed above. The surface formation defined by each of the left-hand and right-hand earshells (9) of the headset is shaped to be symmetrical across a line passing through the surface formation in a direction generally transverse to the direction in which a given harness (1) is arranged to move relative to the earshell (9) when being push-fitted thereto. This means that the reciprocal shaping of a given harness (1) is similarly symmetrical. Thus, reversal of the orientation of a given earshell surface formation relative to a selected harness (1) has no effect on the ability of the former to push-fit to the latter. As a result of this a selected harness (1) may be push-fitted to either of two oppositely facing earshells (9) such as illustrated in FIG. 4. In a first position "A" the harness of FIG. 1 bearing the boom arm (4) is configured to push-fit to a left-hand earshell while the other harness of the pair is configured to push-fit to the right-hand earshell. This configuration may simply be reversed by swapping the location of one of the pair of harnesses with that of the other, as is shown in configuration "B" of FIG. 4 in which the harness carrying the boom arm is attached to the right-hand earshell while the other harness of the pair is attached to the left-hand earshell.

FIG. 5 illustrates another example of an attachment member according to the present invention shaped to push-fit to a shaping in the surface of each of a pair of earshells.

Two attachment members are illustrated in the arrangement of FIG. 5 and to each one of this pair of attachment members is attached a neckband article (54) which is integrally formed with the structure of each of the pair of attachment members.

Referring to FIG. 14 in conjunction with FIG. 5, an attachment member (50) of the attachment means of FIG. 5 is shaped to reciprocally match the shaping of the pair of aligned recesses (18, 19) formed within the outer surface of an earshell (9) to which the attachment member (50) is arranged to be push-fitted. Each attachment member (50) of the attachment means comprises a U-shaped bend (50) formed within a length of resiliently deformable wire. The U-shaped bend comprises a first limb (55) joined to a second limb (56) which extend along one side of the first limb (56) parallel thereto and terminates at an end. The width (i.e. gauge) of the wire of each of the two limbs, and the separation between the two limbs are dimensioned such that the U-bend matches the width of the aligned channel formations (18, 19) defined by the surface formation of the earshell (9) to which the U-bend attachment member is to be push-fitted in use. The attachment member may also be shaped to ensure that both of the first and second (55, 56) U-bend limbs abut the same surface of a given channel (18 or 19) when fitted therein in use. This configuration permits the second limb (56) of the U-bend to urge against the surface of the channel within which it is received in reaction to, and in resistance to, a twisting force applied about the axis of the first limb (55) of the attachment member in use. This renders the attachment member resilient against such twisting forces in use. In alternative embodiments the second limb (56) may be provided in other than a U-shape configuration, such as an L-shaped configuration in conjunction with the first limb (55), and any other suitable configuration may be employed whereby the second limb extends generally transversely from the direction in which the first limb extends. This transverse extension provides the means for resisting the aforementioned twisting forces. Alternatively, the U-bend may be dimensional to freely rotate (or be rotatable in response to a small turning force) about the axis of the first limb (55) and may be rotatable through 360 degrees, or through a limited range of angles determined by the dimensions or shaping of the recess in which it is fitted in use.

Preferably the attachment member (55, 56) is dimensioned to snap-fit or interference-fit, with one or both of the aligned channel formations (18, 19) formed on the surface of the earshell (9) to which the former is to be attached in use.

The attachment means also includes an articulation portion (52, 53, 57) via which the neck-strap article (54) is connected to the U-shaped connection member. The articulation portion is also integrally formed within the same length of wire from which the U-bend and the neck-strap (54) are formed. The articulation portion comprises a three-limb co-planer lobe formation comprising four bend joins in the wire.

A first articulation limb (52) is joined at a bend formation to the end of the first limb (55) of the attachment member (55, 56) other than the one which joins to the second limb (56) of the aforementioned U-bend. The first articulation limb (52) extends in a direction generally transverse to the direction in which the attachment member (55, 56) extends. Movement of the first articulation limb (52) relative to the attachment member (55, 56) is permitted by resilient flexing of the former relative to the latter about the bend join therebetween, or by a tortional/twisting or turning movement of the first articulation portion around/about the long axis of the limb (55) of the attachment member to which it is joined.

A second articulation limb (53) is joined to the first articulation limb by a bend formed in the same wire which forms the first articulation limb. Movement of the second articulation limb relative to the first articulation limb is permitted by resilient flexing of the former relative to the latter at the join therebetween, or by a twisting/tortional movement or turning action therebetween.

The end of the second articulation limb not joined to the first articulation limb is joined to a third articulation limb by means of a bend in the wire forming both the second and third articulation limbs. The third articulation limb (57) extends generally transversely to the direction in which the second articulation limb extends, and the second articulation limb extends in a direction generally transverse to that in which the first articulation limb extends. Each of the first, second and third articulation limbs extend in substantially the same plane. Movement of the third articulation limb (57) relative to the second articulation limb (53) is permitted by resilient flexing of the two about the bend therebetween or by a tortional/twisting or turning movement of the third articulation limb around the second articulation limb at the aforementioned join therebetween.

In this way, multiple resiliently deformable articulation joints are provided by the attachment means intermediate the U-bend attachment member (55, 56) and the neck-brace/band

(54) connected thereto via the intermediate articulation portion. This permits many degrees of freedom of movement of the neck-brace/band (54) relative to each earshell (9) to which it is attached in use.

FIG. 6 illustrates such a connection. It is to be noted that the surface channels (18, 19) defined by the surface formation of the earshell (9), to which the attachment member (55, 56) is to be push-fitted, is not obscured by the harness member (1) when fitted to other such surface formations of the earshell.

As shown in FIG. 6, the location (6) on the outer surface of the earshell (9) of the surface channels (18, 19), within the attachment member is to fit, is off-set (by an amount A) from the axis (600) of symmetry of the earshell. This means that the attachment member of the attachment means fits to the earshell at a location which is generally not directly over the ear of the user when the earshell is placed over his/her ear in use. It has been found that this off-set fitment positioning assists in applying a suitably directed force to the head of the user for maintaining the earshell in position when worn.

In particular, it is preferable that the attachment member of the attachment means is fitted to the earshell at one side of its axis of symmetry (600) such that the neck-brace/band (54) extends over and around the half of the earshell on the other side of the symmetry axis. This means that, when worn, the neck brace/band will be attached to, and will apply a resilient clamping force at, the earshell at a location forward of the ear of the user when worn thereby directing a greater part of the clamping force to those parts of the head of the user in front of his ear rather than behind it. Suitably directing this clamping force in this way better assists in maintaining the earshells on the user's head when worn.

FIGS. 7 and 8 illustrate the arrangement illustrated in FIG. 6 and like articles as between those figures are assigned like reference numerals. FIG. 7 schematically illustrates the rotational/tortional movement (700) permitted by the articulation portion (52, 53, 57) and/or the attachment member (55, 56) when attached to the earshell (9). FIG. 8 illustrates schematically the movement permitted by the flexing (800) of parts of the articulation portion discussed above.

FIG. 11 illustrates an alternative form of attachment means providing a harness (70, 80) shaped to embrace a headshell (9) and to surround peripheral parts of the headshell when attached thereto. In FIGS. 9, 10 and 11 like items are assigned like reference numerals. Similarly, in FIGS. 9 and 10 apparatus illustrated and described with reference to earlier figures is also shown, and like items therein are assigned like reference numerals in FIGS. 9 and 10 accordingly.

The peripheral earshell harness of FIG. 11 comprises a collar structure formed from a single length of resiliently formable wire shaped to form a flattened loop with an opening (75) defined by opposing and separated terminal ends of the wire. Lobe portions (80) are formed within the harness by shaping portions of the wire to deviate from the general sense of curvature of the harness as a whole over a limited region of the harness so as to define a lobe portion which is generally raised from and outwardly radially displaced from the other parts (70) of the harness to which it is connected.

Thus, the harness of FIG. 11 defines a collar structure possessing four equally spaced lobe portions (80) of substantially the same shape and dimension, joined together by, and raised from, intermediate harness portions (70). The terminal opposing ends of the wire forming the collar structure each possesses a terminal lug (90) which extends inwardly of the harness towards opposing inwardly-facing parts of the collar structure thereof. The length of wire defining the harness is sufficiently resiliently deformable to permit the opening (75) between the separated opposing terminal ends of the wire to be increased by a splaying action, whereby the resilience of the wire urges those splayed terminal ends to return to their quiescent positions.

The earshell (9) is provided with a groove or channel formed in the surface thereof which substantially circumscribes the outermost periphery of the edge of the earshell. The width of the wire defining the harness (70, 80), and the shape, dimensions and curvature of the collar structure defined thereby is shaped to reciprocally correspond with the shaping of the surface portion of the earshell (9) defining the groove (85) to allow the portions (70) of the harness intermediate the lobe portions (80) thereof to push-fit intimately within the groove (85) circumscribing the earshell (9) thereby to permit the harness to similarly circumscribe the earshell when so connected. The surface formation of the earshell also includes a pair of blind holes (not shown) which extend into, but do not penetrate, the earshell surface and which are each dimensioned to receive a respective one of the two terminal lug portions (90) located at the terminal ends of the wire forming the harness.

FIG. 9 schematically illustrates the manner in which the harness is connectable to the earshell in question. That is to say, the harness may be simply pushed over the periphery of the earshell where the peripheral surface groove (85) is located, a slight splaying of the resiliently deformable wire forming the harness being required to permit the portions (70) intermediate the lobe portions of the harness to slip over the edge of the circumferential recess (85) and to subsequently clip-fit into the recess by the resilient urging of the wire of the harness once the splaying force has been removed. The same splaying and clipping action enables the terminal lug portions (90) to be slid over and to clip into the respective recesses provided in the surface of the earshell (9) therefore. In this way, the earshell at those portions intermediate its lobe portions, fits into and urges against the base of the groove (85) formed within the surface of the earshell (9) thereby to fit the former to the latter in use.

The depth of the circumferential recess (85) is preferably equal in value, or greater in value, to the diameter of the wire forming the harness. This enables those parts of the harness wire received within the groove to be fully received therein. The raised lobe portions (80) of the harness are raised from those parts of the harness which urge against the earshell in use, by an amount which exceeds the depth of the peripheral groove (85). This ensures that the lobe portions are also raised from, and separated from, the outermost adjacent surface of the earshell (9) at the periphery of the groove therein when the harness is fitted thereto. Consequently a gap is defined in between the raised loop portion and the outermost adjacent surface of the earshell member over which the lobe portion is raised which permits e.g. a strap or other article to be threaded therethrough to enable that article to be attached to the headshell via the lobe portion of the harness.

In the present examples, the lobe portion is shaped to define, in collaboration with the earshell, a gap suitable for receiving a head retention strap, the strap being shaped to extend across a part of the head of the user thereby to strap the earshell to the head of the user when worn. FIG. 10 illustrates the harness attached to an earshell as discussed above in which a lobe portion (80) thereof is raised from the outermost adjacent surface of the earshell therewith to define a gap (95) through which a strap, for example, may be threaded.

FIG. 12 illustrates an earshell (9) including a cable stowage member (130) which projects from the surface thereof (outwardly facing in use) and is located adjacent the outwardly projecting surface portion (11) of the surface formation of the earshell which is shaped to be received by the opening (2)

formed in the body of the harness member (1) discussed with reference to FIGS. 1 to 4 above. The stowage member (130) is also a surface formation of the earshell and is dimensioned to project over a part of the harness member (1) when that harness is push-fitted to the earshell in use thereby to define therewith a stowage channel (140) dimensioned to stow portions of cable (3) which extend from the harness member (1). In particular, the stowage channel (140) is dimensioned and positioned to receive portions of a cable which electrically connects one harness member (1) of a pair of switch harnesses to the other harness member of the pair such as is shown in FIG. 4.

The width of the stowage channel is dimensioned to substantially match the width of the cable (3) it is intended to stow, and the depth of the stowage channel is dimensioned to exceed twice the width of such cable thereby to enable a loop (135) of such cable to be stowed therein.

FIG. 14 illustrates an earshell (9) for use in a communications headset apparatus. The earshell of FIG. 14 possesses features substantially identical to the features of the headshell or headshells discussed above with reference to the preceding drawings of this application. Consequently, as between FIG. 14 and the preceding drawings, like articles are assigned like reference numerals.

In FIG. 14 the earshell (9) defines a body having an earshell signal conduit means (21) embedded therein and extending through a part of the body of the earshell from the outer surface (shown) thereof to the inner surface (not shown) thereof so as to provide a conduit for electrical signals through the earshell between the inner and outer surfaces in question.

The signal conduit means comprises a plurality of electrical contact portions each of which is electrically isolated from the other such portion, and each of which provides a separate electrical signal conduit between the inner and outer surfaces of the earshell. This enables a given one of a plurality of electrical articles located within the earshell in use to be placed in separate electrical connection with one of a separate plurality of electrical articles attached to the outer surface of the earshell (e.g. attached by a harness). The earshell (9) is preferably injection moulded and the electrical conduit means (21) is embedded directly within the body of the earshell during the injection moulding process thereby to enable the signal conduit to be integrally formed with the earshell without requiring through-holes to be formed in the earshell for the purposes of attaching the signal conduit thereto.

The signal conduit (21) is exposed at a surface part of the earshell (9) within the surface portion of the earshell which defines the connection means (11) used to push-fit with a harness member (1) such as is discussed with reference to FIGS. 1 to 4 above. The attachment harness (1) may include a signal conduit means arranged to make electrical contact with the signal conduit (21) embedded in the earshell when the former is push-fitted to the earshell in use thereby to permit electrical signals to be conveyed between the earshell and the attachment harness (1). This enables electrical signals to be conveyed between electrical items (e.g. circuit boards, electro-acoustic transducers etc.) within an earshell and communications hardware (e.g. microphones, signal conduit cables, junction boxes etc) attached to or contained within the attachment harness (1).

FIG. 15 illustrates a communications headset (500) having attached to it electrical communications apparatus (such as that described above in relation to FIGS. 1 to 14). The headset is operably connectable to a host radio or communications console (not shown) via a headset connector cable (7, 515) which permits electrical communications signals to pass between the headset (500) and the remote radio or communications console.

The headset connector cable comprises a first cable portion (7) connected to the headset apparatus (500) via a suitable connection (526) to electrical components (e.g. a junction box) located on the headset apparatus (500), and connected to switching apparatus housed within a switchbox (510) via a suitable connection (527) with the body of the switchbox. Similarly, a second headset cable portion (515) is connected to the same switching apparatus (internal to the switchbox) and extends from a suitable connection (528) with the body of the switchbox and terminates at a console connector means (525) at the distal end thereof.

The switchbox (510) comprises a body with two manually operable switch devices accessible at the surface of the switchbox body. A first manually operable switch device is a Pressell switch (520) and a second switch device is a push-button switch (521). Each such switching device is operably connected to the switching apparatus internal to the body of the switchbox (not shown) so as to enable remote control of operation functions of the remote console (not shown) to which the switchbox (510) is connected remotely via the second portion (515) of the headset cable.

The internal switching apparatus, and the functions of the remote console which may be remotely controlled via operation of either or both of the switching devices (521, 520) may be any suitable such apparatus and control functions as would be readily apparent to the skilled person. For example, such functions include the remote control of the transmit function of the console, remote control of a mute function thereof, or control of monitoring or override functions of operations of the remote console for example. Indeed, virtually any function or operation of the remote console may be arranged to be remotely controllable by operation of the switching devices of the switchbox (510).

FIG. 17 illustrates the switchbox (510) in greater detail. The body of the switchbox is substantially symmetrical across a "Centre Line" (560) indicated in FIG. 17. However, the push-button switch (521) and the Pressell switch (520) are each positioned to one side of the Centre Line (560), while each of the first portion (7) and second portion (515) of the headset connector cable are connected to the body of the switchbox at the other side of the Centre Line. This positioning enables a user to gain manual access to either or both of the switching devices of the switchbox without being impeded or obstructed by the presence of the first and second headset cable portions extending from the switchbox.

The base of the body of the switchbox (510) possesses a shaping (555) which is also substantially symmetrical about the aforementioned Centre Line. FIG. 16 illustrates a support platform (530) having an attachment means (535) for attaching the support platform to an item of clothing of the wearer of the headset apparatus (500) in use. The attachment means may be any suitable attachment means such as would be readily apparent to the skilled person, and may include a clip, catch, hook or a pin or the like (not shown). The support platform comprises a back plate (540) to which the attachment means (not shown) is connected, and a platform member (545) extending outwardly from an edge of the back plate lowermost in use, and extends generally transversely to the face of the back plate outwardly presented in use.

The support platform (545) defines a bowl formation (550) the cavity of which is shaped to reciprocally correspond with the shaping of the symmetrical base formation (555) of the switchbox body (510) thereby to releasably receive the switchbox base formation to enable that formation to intimately fit into the cavity of the support platform bowl (550). The switchbox base formation (555) is thereby able to intimately fit in abutment with surfaces of the bowl cavity (550) thereby to enable the switchbox to snap-fit, or at least grip-fit, therewith.

A consequence of the symmetry of both the switchbox body base formation (555), and the reciprocally shaped support platform bowl cavity (550) is the reversibility of the positioning of the switchbox body relative to the support platform (530). FIG. 18A, 18B and FIG. 19 schematically illustrate this reversibility. Like items as between FIGS. 18A, 18B, 19 and FIGS. 15 to 17 are assigned like reference numerals.

FIG. 18A illustrates the switchbox in a first orientation (orientation "A") thereby presenting the front side of the switchbox to the viewer, while FIG. 18B illustrates the switchbox in a reverse orientation in which the reverse side of the switchbox body is presented to the viewer (orientation "B"). It is to be noted that in either of these two orientations the formation (555) formed in the base of the switchbox body presents the same profile to the support platform bowl cavity (550) when the former is received in the latter as is schematically illustrated in FIG. 19.

In this way, the headsets connector cable portions (7, 515) extending from the body of the switchbox, and both of the two manually operable switch devices (520, 521) on the body of the switchbox are reversed in their orientation relative to the support platform (530) as between the two opposite orientations "A" and "B". This enables the switchbox body to be positioned in a most convenient orientation relative to the user of the headset apparatus (500), and the wearer of the support platform (530) without requiring any relocation of, or modification to, the support platform in its attachment to the wearer's clothing. For example, when positioned in orientation "A" the switching devices of the switchbox may be optimally positioned for access thereto by the right hand of the user, while orientation "B" may provide optimal access by the left hand of the user. Thus, the user may simply switch between these two orientations, as and when required, merely by detaching the switchbox from the support platform, reversing its orientation relative to the support platform, and reconnecting the switchbox to the support platform.

It is to be understood that modifications and variations, such as would be readily apparent to the skilled person, may be made to the embodiments described above (which are purely exemplary) without departing from the scope of the present invention disclosed herein.

The invention claimed is:

1. A headset apparatus to be worn about the head of a user comprising:
   a first earshell and a second earshell oppositely facing the first earshell, each earshell arranged to be worn over an ear of a user and having a surface portion shaped to define a respective headwear connection means;
   an article adapted to be indirectly attached to the first or second earshell; and
   an attachment means adapted to be worn on either the user's left hand side or right hand side for indirectly attaching the article to the first or second earshell via the attachment means, wherein the attachment means has two opposite sides such that a first one of the opposite sides faces towards the head of a user and a second one of the opposite sides faces outwardly from the head of the user when the headset apparatus is worn about the head of the user, the attachment means being attached to the article,
   wherein each of the two opposite sides of the attachment means has a reciprocal connection means shaped to reciprocally correspond with a shaping of the surface portion defining the respective headwear connection means to allow the headwear connection means and the respective reciprocal connection means to push-fit together without penetrating the surface portion, thereby allowing the article to be indirectly attached by the attachment means to the surface portion of either one of the oppositely facing first and second earshells and retaining the orientation of the article relative to the oppositely facing first and second earshells.

2. The headset apparatus according to claim 1, wherein the article includes a microphone boom arm carrying thereon a microphone apparatus.

3. The headset apparatus according to claim 1, wherein each one of said two sides of the attachment means presents a respective reciprocal connection means having substantially the same shaping as that of the reciprocal connection means presented by the other said side of the attachment means.

4. The headset apparatus according to claim 1, wherein the body of one of the headwear connection means and reciprocal connection means defines a channel, recess or opening therein and the body of the other of the headwear and reciprocal connection means is shaped and arranged to fit intimately within said channel, recess or opening to abut the body of the connection means where it defines said channel, recess or opening.

5. The headset apparatus according to claim 1, wherein said article is a signal conduit for conveying electrical signals to/from the attachment means.

6. The headset apparatus according to claim 1, wherein said article is a headset retention apparatus for use in retaining the headset about the head of the user.

7. The headset apparatus according to claim 1, further comprising a further attachment means for attaching an article to an aforesaid earshell, the further attachment means having a reciprocal connection means shaped to reciprocally correspond with a shaping of the surface portion defining an aforesaid headwear connection means to allow the headwear connection means and reciprocal connection means to push-fit together thereby to connect the further attachment means to the surface of the earshell without penetrating that surface.

8. The headset apparatus according to claim 7, wherein the attachment means is connected to the further attachment means.

9. The headset apparatus according to claim 7, wherein the reciprocal connection means of the further attachment means is arranged to connect to the headwear connection means of either one of the earshells to place the further attachment means in the same orientation relative to the first and second earshells of the headset in use.

10. The headset apparatus according to claim 1, wherein an aforesaid reciprocal connection means is an aperture through which an aforesaid headwear connection means is shaped to extend when the attachment means is connected to the earshell.

11. The headset apparatus according to claim 1, further comprising communications means connected to an aforesaid attachment means for attachment to an aforesaid earshell thereby, and means for conveying from the headset apparatus via the attachment means electrical communications signals generated by the communications means.

12. The headset apparatus according to claim 1, wherein an aforesaid earshell is arranged to be worn against the head of a user to cover an ear of the user.

13. The headset apparatus according to claim 1, wherein an aforesaid earshell is integrally formed with its headwear connection means.

14. The headset apparatus according to claim 1, wherein an aforesaid reciprocal connection means is shaped to fit to an aforesaid headwear connection means substantially to prevent movement of the reciprocal connection means relative to the headwear connection means being other than the relative movement via which the reciprocal connection means is detachably attachable to the headwear connection means.

15. The headset apparatus according to claim 1, further comprising locking means arranged to engage with an aforesaid earshell and/or an aforesaid attachment means of the headset to retain the aforesaid attachment means connected to the earshell when the two are fitted together.

16. The headset apparatus according to claim 15, wherein the locking means is arranged to prevent movement of an aforesaid reciprocal connection means relative to an aforesaid headwear connection means being the relative movement via which the reciprocal connection means is detachable to the headwear connection means.

17. The headset apparatus according to claim 1, wherein said article is a cable, and in which an aforesaid earshell includes a cable stowage member which projects therefrom and is located adjacent said headwear connection means so as to project over a part of the reciprocal connection means when fitted to the headwear connection means in use thereby to define therewith a stowage channel dimensioned to stow portions of said cable.

18. The headset apparatus according to claim 17, wherein the width of the stowage channel is dimensioned to substantially match the width of said cable.

19. The headset apparatus according to claim 18, wherein the depth of said stowage channel is dimensioned to be equal to or greater than the width of said cable.

20. The headset apparatus according to claim 19, wherein the depth of said stowage channel is dimensioned to be equal to at least twice the width of said cable.

21. The headset apparatus according to claim 1, wherein an aforesaid earshell defines a body having headwear signal conduit means embedded therein and extending through a part of the body of the earshell from one surface part of the body to a different surface part thereof so as to provide a conduit for electrical headwear signals through said body part between said different surface parts.

22. The headset apparatus according to claim 21, wherein said headwear signal conduit means is an electrically conductive element embedded directly within said body of the earshell.

23. The headset apparatus according to claim 21, wherein said body of the earshell is formed by molding and said headwear signal conduit means is embedded within said body by said molding.

24. The headset apparatus according to claim 21, wherein the headwear signal conduit means is exposed at a surface part of the earshell adjacent or within the surface portion of the earshell defining said headwear connection means, and said attachment means includes signal conduit means arranged to make electrical contact with said headwear signal conduit means when connected to the surface of the earshell thereby to permit electrical signals to be conveyed between the earshell and the attachment means.

25. The headset apparatus according to claim 21, wherein the earhsell is arranged to be worn over an ear of the user and includes electrical communications means for providing audible signals to and/or from a surface of the earshell (e.g. a cavity wall) facing the ear of the user generated thereby from electrical signals conveyed thereto from the attachment means via said headwear signal conduit means.

* * * * *